(12) United States Patent
Tzannes

(10) Patent No.: US 7,508,876 B2
(45) Date of Patent: *Mar. 24, 2009

(54) FAST INITIALIZATION USING SEAMLESS RATE ADAPTATION

(75) Inventor: Marcos C. Tzannes, Orinda, CA (US)

(73) Assignee: Aware, Inc., Bedford, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/765,746

(22) Filed: Jun. 20, 2007

(65) Prior Publication Data

US 2007/0242737 A1    Oct. 18, 2007

Related U.S. Application Data

(60) Continuation of application No. 11/672,130, filed on Feb. 7, 2007, now abandoned, which is a continuation of application No. 11/424,981, filed on Jun. 19, 2006, now abandoned, which is a continuation of application No. 11/258,010, filed on Oct. 26, 2005, now abandoned, which is a continuation of application No. 11/156,537, filed on Jun. 21, 2005, now abandoned, which is a continuation of application No. 10/760,495, filed on Jan. 21, 2004, now abandoned, which is a division of application No. 10/459,535, filed on Jun. 12, 2003, now abandoned, which is a division of application No. 10/046,192, filed on Jan. 16, 2002, now Pat. No. 6,654,410.

(60) Provisional application No. 60/262,240, filed on Jan. 16, 2001.

(51) Int. Cl.
 *H04B 1/38* (2006.01)
 *H04L 27/00* (2006.01)

(52) U.S. Cl. .................... 375/260; 375/222

(58) Field of Classification Search ............. 375/219, 375/220, 260, 222, 259
See application file for complete search history.

(56) References Cited

U.S. PATENT DOCUMENTS 5,400,322 A * 3/1995 Hunt et al. .................. 370/468

(Continued)

FOREIGN PATENT DOCUMENTS

AU    2002243532    7/2006

(Continued)

OTHER PUBLICATIONS

"T1.413 Issue 2", American National Standards Institute (ANSI), Nov. 30-Dec. 4, 1998, 270 pages.

(Continued)

*Primary Examiner*—David B Lugo
(74) *Attorney, Agent, or Firm*—Sheridan Ross P.C.; Jason H. Vick

(57) ABSTRACT

A method for initializing modems in a multicarrier transmission system to establish a communication link between the transmitter and the receiver. An exemplary embodiment includes the steps of providing a predetermined parameter value that approximates a corresponding actual parameter value of the communication link, establishing a data communication link between a first transceiver and a second transceiver using the predetermined parameter value to allow the transmission of data, determining the actual parameter value, and seamlessly increasing the data rate of the established data communication link by using the determined actual parameter value to provide an steady state communication link with an updated data rate.

3 Claims, 9 Drawing Sheets

U.S. PATENT DOCUMENTS

| | | | |
|---|---|---|---|
| 5,910,959 | A | 6/1999 | Olafsson et al. |
| 6,064,692 | A | 5/2000 | Chow |
| 6,072,779 | A | 6/2000 | Tzannes et al. |
| 6,272,170 | B1 | 8/2001 | Chu |
| 6,498,808 | B1 | 12/2002 | Tzannes |
| 6,567,473 | B1 | 5/2003 | Tzannes |
| 6,654,410 | B2 | 11/2003 | Tzannes |
| 6,667,991 | B1 | 12/2003 | Tzannes |
| 2002/0034196 | A1 | 3/2002 | Tzannes |

FOREIGN PATENT DOCUMENTS

| | | |
|---|---|---|
| WO | 00/54473 | 9/2000 |

OTHER PUBLICATIONS

"ITU-T Recommendation G.992.1" International Telecommunication Union, Jun. 1999, 256 pages.

"ITU-T Recommendation G.992.2" International Telecommunication Union, Jun. 1999, 179 pages.

International Search Report for International (PCT) Patent Application No. PCT/US02/00966, Mailing Date: Jul. 1, 2002.

International Preliminary Examination Report for International (PCT) Patent Application No. PCT/US02/00966, mailed Sep. 25, 2003.

Examiner's First Report for Australian Patent Application No. 2006202445, mailed Feb. 6, 2007.

Official Action for European Patent Application No. 02709024.0 mailed Nov. 28, 2003.

Notice of Preliminary Rejection for Korean Patent Application No. 7025783/2006, dated May 7, 2007.

Examination Report for European Patent Application No. 05003655.7 mailed Apr. 7, 2008.

Notice of Preliminary Rejection for Korean Patent Application No. 2003-7009500, dated Feb. 29, 2008.

European Search Report for European Patent Application No. 05003655.7 mailed Aug. 7, 2007.

* cited by examiner

FAST INITIALIZATION USING SEAMLESS RATE ADAPTATION

RELATED APPLICATION DATA

This application is a continuation of U.S. application Ser. No. 11/672,130, filed Feb. 7, 2007, entitled "Fast Initialization Using Seamless Rate Adaptation", now abandoned, which is a continuation of U.S. application Ser. No. 11/424,981, filed Jun. 19, 2006, entitled "Fast Initialization Using Seamless Rate Adaptation", now abandoned, which is a continuation of U.S. patent application Ser. No. 11/258,010, filed Oct. 26, 2005, entitled "Fast Initialization Using Seamless Rate Adaptation", now abandoned, which is a continuation of U.S. patent application Ser. No. 11/156,537, filed Jun. 21, 2005, entitled "Fast Initialization Using Seamless Rate Adaptation", now abandoned, which is a continuation of U.S. patent application Ser. No. 10/760,495, filed Jan. 21, 2004, entitled "Fast Initialization Using Seamless Rate Adaptation", now abandoned which is a divisional application of U.S. application Ser. No. 10/459,535 entitled "Fast Initialization Using Seamless Rate Adaptation," filed Jun. 12, 2003, now abandoned, which is a Divisional of U.S. application Ser. No. 10/046,192, entitled "Fast Initialization Using Seamless Rate Adaptation," filed Jan. 16, 2002, now U.S. Pat. No. 6,654,410, which claims the benefit of and priority to U.S. Provisional Application Ser. No. 60/262,240, filed Jan. 16, 2001, entitled "Fast Initialization Using Seamless Rate Adaptation," now expired, and is related to U.S. patent application Ser. No. 09/522,870, filed Mar. 10, 2000, entitled "A Method for Seamlessly Changing Power Modes and ADSL Systems," now U.S. Pat. No. 6,567,473, U.S. patent application Ser. No. 09/522,869, filed Mar. 10, 2000, entitled "Seamless Rate Adapted Adaptive Multicarrier Modulation System and Protocols," now U.S. Pat. No. 6,498,808, U.S. patent application Ser. No. 09/523,086, filed Mar. 10, 2000, entitled "A Method for Synchronizing Seamless Rate Adaptation," now U.S. Pat. No. 6,667,991, and U.S. patent application Ser. No. 09/918,033, filed Aug. 1, 2001, entitled "Systems and Methods for Transporting a Network Timing Reference in an ADSL System," now U.S. Pat. No. 6,465,750, all of which are incorporated herein by reference in their entirety.

BACKGROUND OF THE INVENTION

1. Field of the Invention

This invention generally relates to Digital Subscriber Line (DSL) systems. In particular, this invention relates to a method of initializing modems in a DSL system.

2. Description of Related Art

Multicarrier modulation, or Discrete Multitone Modulation (DMT), is a transmission method that is being widely used for communication over media, and especially over difficult media. Multicarrier modulation divides the transmission frequency band into multiple subchannels, i.e., carriers, with each carrier individually modulating a bit or a collection of bits. A transmitter modulates an input data stream containing information bits with one or more carriers and transmits the modulated information. A receiver demodulates all of the carriers in order to recover the transmitted information bits as an output data stream.

Multicarrier modulation has many advantages over single carrier modulation. These advantages include, for example, a higher immunity to impulse noise, a lower complexity equalization requirement in the presence of a multipath, a higher immunity to narrow band interference, a higher data rate and bandwidth flexibility. Multicarrier modulation is being used in many applications to obtain these advantages, as well as for other reasons. The applications include, for example, Asymmetric Digital Subscriber Line (ADSL) systems, Wireless LAN systems, power line communications systems, and other applications. ITU standards G.992.1, G.992.2 and the ANSI T1.413 standard, each of which are incorporated herein by reference in their entirety, specify standard implementations for ADSL transceivers that use multicarrier modulation.

FIG. 1 illustrates an exemplary standard compliant ADSL DMT transmitter 100. In particular, the ADSL DMT transmitter 100 comprises three layers: the modulation layer 110, the Framer/Forward Error Correction (FEC) layer 120, and the ATM TC (Asynchronous Transfer Mode Transmission Convergence) layer 140.

The modulation layer 110 provides the functionality associated with DMT modulation. In particular, DMT modulation is implemented using an Inverse Discrete Fourier Transform (IDFT) 112. The IDFT 112 modulates bits from the Quadrature Amplitude Modulation (QAM) encoder 114 into the multicarrier subchannels. The ADSL multicarrier transceiver modulates a number of bits on each subchannel, the number of bits depending on the Signal to Noise Ratio (SNR) of that subchannel and the Bit Error Rate (BER) requirement of the communications link. For example, if the required BER is $1 \times 10^{-7}$, i.e., one bit in ten million is received in error on average, and the SNR of a particular subchannel is 21.5 dB, then that subchannel can modulate 4 bits, since 21.6 dB is the required SNR to transmit 4 QAM bits with a $1 \times 10^{-7}$ BER. Other subchannels can have a different SNR's and therefore may have a different number of bits allocated to them at the same BER. The current ITU and ANSI ADSL standards allow up to 15 bits to be modulated on one carrier.

A table that specifies how many bits are allocated to each subchannel for modulation in one DMT symbol is called a Bit Allocation Table (BAT). A DMT symbol is the collection of analog samples generated at the output of the IDFT by modulating the carriers with bits according to the BAT. The BAT is the main parameter used in the modulation layer 110. The BAT is used by the QAM encoder 114 and the IDFT 112 for encoding and modulation. The following Table illustrates an example of a BAT for an exemplary DMT system having 16 subchannels.

TABLE 1

| Subchannel Number | Bits per Subchannel |
|---|---|
| 1 | 5 |
| 2 | 9 |
| 3 | 3 |
| 4 | 2 |
| 5 | 4 |
| 6 | 0 |
| 7 | 5 |
| 8 | 7 |
| 9 | 8 |
| 10 | 3 |
| 11 | 0 |
| 12 | 5 |
| 13 | 6 |
| 14 | 8 |
| 15 | 4 |
| 16 | 3 |
| Total Bits Per DMT Symbol | 80 |

In ADSL systems, the typical DMT symbol rate is approximately 4 kHz. This means that a new DMT symbol modulating a new set of bits, using the modulation BAT, is transmitted every 250 microseconds. If the exemplary BAT in Table 1, which specifies 80 bits modulated in one DMT symbol, were used at a 4 kHz DMT symbol rate, the bit rate of the system would be 4000*80=320 kbits per second (kbps).

The BAT determines the data rate of the system and is dependent on the transmission channel characteristics, i.e., the SNR of each subchannel in the multicarrier system. A channel with low noise, i.e., a high SNR on each subchannel, will have many bits modulated on each DMT carrier and will thus have a high bit rate. If the channel conditions are poor, e.g., high noise, the SNR will be low and the bits modulated on each carrier will be few, resulting in a low system bit rate. As can be seen in Table 1, some subchannels may actually modulate zero bits. An example is the case when a narrow band interferer, such as an AM broadcast, is present at a subchannel's frequency and causes the SNR in that subchannel to be too low to carry any information bits.

The ATM TC layer 140 comprises an Asynchronous Transfer Mode Transmission Convergence (ATM TC) section 142 that transforms bits and bytes in cells into frames.

The Framer/FEC layer 120 provides the functionality associated with preparing a stream of bits for modulation. The Framer/FEC layer 120 comprises an Interleaving (INT) portion 122, a Forward Error Correction (FEC) portion 124, a scrambler (SCR) portion 126, a Cyclic Redundancy Check (CRC) portion 128 and an ADSL Framer portion 130. The Interleaving and FEC coding provide an impulse immunity and a coding gain. The FEC portion 124 in the standard ADSL system is a Reed-Solomon (R-S) code. The scrambler 126 is used to randomize the data bits. The CRC portion 128 is used to provide error detection at the receiver. The ADSL Framer portion 130 frames the received bits from the ATM framer 142. The ADSL framer 130 also inserts and extracts overhead bits from the module 132 for modem to modem overhead communication channels, which are known as EOC and AOC channels in the ADSL standards.

The key parameters of the Framer/FEC layer 120 are the size of the R-S codeword, the size, i.e., depth, of the interleaver, which is measured in the number of R-S codewords, and the size of the ADSL flame. As an example, a typical size for an R-S codeword may be 216 bytes, a typical size for interleaver depth may be 64 codewords, and a typical size of the ADSL frame may be 200 bytes. It is also possible to have an interleaving depth equal to one, which is equivalent to no interleaving. In order to recover the digital signal that was originally prepared for transmission using a transmitter as discussed above, it is necessary to deinterleave the codewords by using a deinterleaver that performs the inverse process to that of the interleaver, with the same depth parameter. In the current ADSL standards, there is a specific relationship between all of these parameters in a DMT system. Specifically, the BAT size, $N_{BAT}$, i.e., the total number of bits in a DMT symbol, is fixed to be an integer divisor of the R-S codeword size, $N_{FEC}$, as expressed in Equation 1:

$$N_{FEC}=S*N_{BAT},\quad\quad\quad\quad(1)$$

where S is a positive integer greater than 0.

This constant can also be expressed as one R-S codeword containing an integer number of DMT symbols. The R-S codeword contains data bytes and parity, i.e, checkbytes. The checkbytes are overhead bytes that are added by the R-S encoder and are used by the R-S decoder to detect and correct bit errors. There are R checkbytes in a R-S codeword. Typically, the number of checkbytes is a small percentage of the overall codeword size, e.g., 8%. Most channel coding methods are characterized by their coding gain, which is defined as the system performance improvement, in dB, provided by the code when compared to an uncoded system. The coding gain of the R-S codeword depends on the number of checkbytes and the R-S codeword size. A large R-S codeword, e.g., greater than 200 bytes in a DMT ADSL system, along with 16 checkbytes, i.e., 8% of the 200 bytes, will provide close to the maximum coding gain of 4 dB. If the codeword size is smaller and/or the percentage of checkbyte overhead is high, e.g., greater than 30%, the coding gain may be very small or even negative. In general, it is best to have the ADSL system operating with the largest possible R-S codeword, with the current maximum being 255 bytes, and approximately 8% redundancy.

There is also a specific relationship between the number of bytes in an ADSL frame, $N_{FRAME}$, and the R-S codeword size, $N_{FEC}$ that is expressed in Equation (2):

$$N_{FEC}=S\times N_{FRAME}+R,\quad\quad\quad\quad(2)$$

where R is the number of R-S checkbytes in a codeword and S is the same positive integer as in Equation (1).

It is apparent from equating the right-hand sides of Equations (1) and (2) that the relationship expressed in Equation (3) results in:

$$N_{BAT}=N_{FRAME}+R/S.\quad\quad\quad\quad(3)$$

The current ADSL standard requires that the ratio (R/S) is an integer, i.e. there is an integer number of R-S checkbytes in every DMT-symbol ($N_{BAT}$). As described above, ADSL frames contain overhead bytes, which are not part of the payload, that are used for modem to modem communications. A byte in an ADSL frame that is used for the overhead channel cannot be used for the actual user data communication, and therefore the user data rate decreases accordingly. The information content and format of these channels is described in the ITU and ANSI standards. There are several framing modes defined in ADSL standards. Depending on the framing mode, the number of overhead bytes in one ADSL frame varies. For example, standard Framing Mode 3 has 1 overhead byte per ADSL frame.

Equations (1), (2) and (3) demonstrate that the parameter restrictions imposed by the standards result in the following conditions:

All DMT symbols have a fixed number of overhead framing bytes that are added at the ADSL framer. For example, in Framing Mode #3, there is 1 overhead framing byte per DMT symbol.

There is a minimum of one R-S checkbyte per DMT symbol.

The maximum number of checkbytes according to ITU Standard G.992.2 (8) and ITU Standards G.992.2 and T1.413 (16) limits the maximum codeword size to $8*N_{BAT}$ for G.992.2, and to $16*N_{BAT}$ for G.992.1 and T1.413.

An ADSL modem cannot change the number of bits in a DMT symbol ($N_{BAT}$) without making the appropriate changes to the number of bytes in a R-S codeword ($N_{FEC}$) and an ADSL frame ($N_{FRAME}$).

The above four restrictions cause performance limitations in current ADSL systems. In particular, because of condition 1, every DMT symbol has a fixed number of overhead framing bytes. This is a problem when the data rate is low and the overhead framing bytes consume a large percentage of the possible throughput, which results in a lower payload. For example, if the date rate supported by the line is 6.144 Mbps, this will result in a DMT symbol with about 192 bytes per symbol (192*8*4000=6144 kbps). In this case, one overhead framing byte would consume 1/192 or about 0.5% of the available throughput. But if the date rate is 128 kbps, or 4 bytes per symbol, the overhead framing byte will consume ¼ or 25% of the available throughput. Clearly this is undesirable.

Condition 2 will cause the same problems as condition 1. In this case, the overhead framing byte is replaced by the R-S checkbyte.

Condition 3 will not allow the construction of large codewords when the data rate is low. The R-S codewords in ADSL can have a maximum of 255 bytes. The maximum coding gain is achieved when the codeword size is near the maximum 255 bytes. When the data rate is low, e.g., 128 kbps or 4 bytes per symbol, the maximum codeword size will be 8*4=32 bytes for G.992.2 systems and 16*4=64 bytes for G.992.1 and T1.413 systems. In this case the coding gain will be substantially lower than for large codewords approaching 255 bytes.

In general, if the data rate is low, e.g., 128 kbps or 4 bytes per symbol, the above conditions will result in 1 byte being used for overhead framing, and 1 byte being consumed by an R-S checkbyte. Therefore 50% of the available throughput will not be used for payload and the R-S codeword size will be at most 64 bytes, resulting in negligible coding gain.

Condition 4 affects the ability of the modem to adapt its transmission parameters on-line in a dynamic manner.

G.992.1 and T1.413 specify a mechanism to do on-line rate adaptation, called Dynamic Rate Adaptation (DRA), but it is clearly stated in these standards that the change in data rate will not be seamless. In general, current ADSL DMT modems use Bit Swapping and dynamic rate adaptation (DRA) as methods for on-line adaptation to channel changes. Bit swapping is specified in the ITU and ANSI standards as a method for modifying the number of bits allocated to a particular carrier. Bit Swapping is seamless, i.e., it does not result in an interruption in data transmission and reception, however, bit swapping does not allow a changing of data rates. Bit Swapping only allows the changing of the number of bits allocated to carriers while maintaining the same data rate. This is equivalent to changing the entries in the BAT table without allowing the total number of bits ($N_{BAT}$) in the BAT to increase or decrease.

DRA enables a change in data rate, but is not seamless. DRA is also very slow because it requires the modem located in the Central Office (CO) to make the final decision on the data rate configuration. This model, where the CO being the master, is common among ADSL modems that are designed to provide a service offered and controller by the telephone company.

Both Bit Swapping and DRA use a specific protocol that is specified in the ANSI T1.413, G.992.1 and G.992.2 standards for negotiating the change. This protocol negotiates the parameters using messages that are sent via an AOC channel, which is an embedded channel. This protocol is sensitive to impulse noise and high noise levels. If the messages are corrupted, the transmitter and receiver can enter a state where they are using different transmission parameters, e.g., BAT, data rate, R-S codeword length, interleaver depth, etc. When two communicating modems enter a state of mismatched transmission parameters, data will be received in error and the modems will eventually be required to take drastic measures, such as full re-initialization, in order to restore error free transmission. Drastic measures such as full reinitialization will result in the service being dropped for approximately 10 seconds, which is the time required for the current standards compliant ADSL modem to complete a full initialization.

A transceiver has both a transmitter and a receiver. The receiver includes the receiver equivalent blocks of the transmitter as shown in FIG. 1. The receiver has modules that include a decoder, a deinterleaver and a demodulator. In operation, the receiver accepts a signal in analog form that was transmitted by a transmitter, optionally amplifies the signal in an amplifier, filters the signal to remove noise components and to separate the signal from other frequencies, converts the analog signal to a digital signal through the use of an analog to digital converter, demodulates the signal to generate the received bit stream from the carrier subchannels by the use of a demodulator, deinterleaves the bit stream by the use of a deinterleaver, performs the FEC decoding to correct errors in the bit stream by use of an FEC decoder, descrambles the bit stream by use of a descrambler, and detects bit errors in the bit stream by use of a CRC. Various semiconductor chip manufacturers supply hardware and software that can perform the functions of a transmitter, a receiver, or both.

In addition, to establish communication between the transceivers at the very onset, full initialization of the modems of the transceivers must be completed. Conventional ADSL modems will always go through an initialization procedure during which known training signals are set between the transceivers. Conventional ADSL modems utilize an initialization procedure as specified in the 992.1 and 994.1 standards, as well as the published but not yet adopted G.dmt.bis standard, which are incorporated herein by reference.

The primary purpose of the initialization procedure is to measure the line conditions and train all receiver functions of the transceivers to optimize the ADSL, transmission system to thereby maximize the data rates.

During the initialization procedure various transmission parameter values are determined. The parameters values include, for example, bit error rate, bit allocation value, gain value, or such parameter values that have been grouped such as in bit allocation tables and gain tables as well as other parameters such as the overhead bits of the EOC and AOC channels, size of the R-S codeword, number of parity bits in the R-S codeword, depth of the interleaver, size of the ADSL, frame, and overhead framing bytes. The parameter values may also be the signal to noise ratio (SNR) of the channel that is accurately measured so that maximum possible data rate can be attained, the time domain equalizer filter taps, the frequency domain equalizer filter taps, the echo canceller filter taps, and the like.

Typically, the full initialization procedure is attained in a series of initialization steps where one or more of the above noted parameter values that define the characteristics of the communication link between the transceivers are determined in one initialization step prior to proceeding to the next initialization step. This standard initialization procedure is illustrated in the functional block diagram of FIG. 2. Upon beginning the initialization of the modems of the transceivers in the ADSL transmission system in step S20, a series of initialization steps are taken in sequence: initialization step S22, initialization step S24, and then initialization step S26. Each of these initialization steps require one or more parameter values noted previously that define the characteristics of the communication link between the transceivers. In this regard, the actual parameter value A indicated as 21 is needed to complete initialization step S22, the actual parameter value B indicated as 23 is needed to complete initialization step S24, and the actual parameter value C indicated as 25 is needed to complete initialization step S26. Each of these actual parameter values must be determined based on the type of modem, the standards used, and the condition of the communication channel in the standard initialization procedures.

Of course, these initialization steps are illustrated generically since they depend on the particular initialization standard followed. For instance, in initialization step S22, a handshake procedure between the transceivers may be performed to indicate that a communication link is desired between them. In initialization step S24, a channel between the transceivers that is available for use in establishing the communication link may be discovered. The initializing step S26 may be the step in which the transceivers are trained based on additional parameter values to designate attributes of the discovered channel. For example, in a multicarrier communication system step S26 may be used to measure the SNR of every subchannel. Based on the measured SNR parameter the transceiver would determine the bit allocation and gain tables. In this regard, each of the initialization steps would likely entail determination and/or use of one or more of the various parameter values by one or both of the modems, depending on the parameter value, to aid in the process of establishing the steady state communication link.

Once the various parameter values are determined and the receiver signal processors are trained in the initialization steps, the initialization of the modems are complete as indicated by S27, thus allowing the modems to establish a steady state communication link as shown in S28. When such steady state communication link is established as indicated by S28, the transmission system is functional and is in a data transmission mode so that the user may operate the communications system to transmit and receive data.

SUMMARY OF THE INVENTION

In the above described standard initialization procedure shown in FIG. 2, the steady state communication link is only established after the completion of all the initialization steps. Time is required to determine the actual parameter values required in the various initialization steps. In this regard, as noted previously, the initialization of the modems of the transceivers compliant to the current standards typically take approximately 10 seconds, during which time the user is precluded from using the system. Thus, the user must wait for the completion of initialization of the modems before the communication system establishes a communication link that allows the user to utilize the system to transmit and receive data. This delay of approximately 10 seconds is viewed by many users, equipment providers and service providers as a negative aspect of ADSL service since it means that every time the ADSL link is established or reconnected after a loss of synchronization, the user must wait approximately 10 seconds for the complete initialization to finish prior to using the system.

Moreover, as also noted previously, this initialization period not only occurs during the initial powering of the system, but also when two communicating modems enter a state of mismatched transmission parameters which result in data being received, for example, in error. Since full reinitialization is required to restore error free transmission, the data service is dropped for the duration of the reinitialization period so that the user is again precluded from utilizing the system. This results in numerous 10 second delays if the two communicating modems are prone to entering a state of mismatched transmission due to changes in line quality, interference, or the like.

In view of the above, one aspect of an exemplary embodiment of the present invention is that it provides a method for initializing modems which reduces the duration in which the user is precluded from utilizing the system as a communication link.

Another aspect of an exemplary embodiment of the present invention is that it provides a method for initializing modems that allows a rapid transition to a data communications state.

Still another aspect of an exemplary embodiment of the present invention is that it provides such a method for initializing modems that optimizes the communication link between the modems while data is communicated therebetween.

In accordance with one embodiment of the present invention, the above noted advantages are attained by a method for initializing transceivers in a multicarrier transmission system to establish a communication link between the transmitter and the receiver. The method includes the steps of providing at least one predetermined parameter value that approximates a corresponding actual parameter value of the communication link between the transmitter and the receiver, establishing a data communication link between the transmitter and the receiver using the at least one predetermined parameter value as an approximation of the actual parameter value of the communication link, thus allowing the multicarrier transmission system to transmit data between the transmitter and the receiver, the data communication link established using the at least one predetermined parameter value having an associated data rate that may be different than a data rate attained when the actual parameter value corresponding to the at least one predetermined parameter value is used, determining the actual parameter value corresponding to the at least one predetermined parameter value after establishing the data communication link using the predetermined parameter value, and seamlessly adapting the data rate of the established communication link by using the determined actual parameter value to provide a steady state communication link with a different data rate.

In the above regard, the at least one predetermined parameter value may be a plurality of predetermined parameter values that approximate a plurality of actual parameter values where the communication link is established using the plurality of predetermined parameter values. The data rate of the communication link established using the plurality of predetermined parameter values may be different than a data rate attained when the plurality of actual parameter values are used. Each of the plurality of actual parameter values are determined and the data rate of the communication link is seamlessly adapted using the determined plurality of actual parameter values. In this regard, the exemplary step of determining each of the plurality of actual parameter values is attained iteratively in a manner that at least one actual parameter value is determined in each iteration. Preferably, the exemplary method further includes the step of iteratively seamlessly adapting the data rate of the communication link after each iteration as the at least one actual parameter value is determined in each iteration.

In accordance with another exemplary embodiment, the plurality of predetermined parameter values and the corresponding actual parameter values may be indicative of at least one of a signal to noise ratio, a bit error rate, a bit allocation value, a bit allocation table, a gain value and a gain table. Alternatively, or in addition, the plurality of predetermined parameter values and the corresponding actual parameter values may be indicative of at least one of overhead bits of EOC and AOC channels, codeword size, number of parity bits in a codeword, depth of an interleaver, size of an ADSL frame, and overhead framing bytes. Alternatively, or in addition, the plurality of predetermined and the corresponding actual parameter values may be indicative of the channel SNR, the time domain equalizer filter taps, the frequency domain equalizer filter taps and the echo canceller filter taps.

In accordance with another exemplary aspect of the present invention, a modem initializing procedure is provided for initializing modems in a multicarrier transmission system that minimizes the amount of time in the initialization sequence before transitioning to a data communication state.

The modem initializing procedure includes the steps of exchanging a message that indicates that a communication link is desired between the transceivers, determining a channel between the plurality of transceivers that is available for use in establishing the communication link, accessing at least one predetermined parameter value that approximates an actual parameter value of the communication link between the transmitter and the receiver, training the transceivers using the at least one predetermined parameter value to designate attributes of the determined channel, establishing a data communication link through the determined channel using the at least one predetermined parameter value to allow a user to use the multicarrier transmission system to transmit and receive data between the plurality of transceivers, the established data communication link having a data rate that is generally, although not necessarily, lower than a data rate attainable using the actual parameter value that corresponds to the at least one predetermined parameter value, analyzing the channel to determine the actual parameter value after establishing the data communication link using the at least one predetermined parameter value, and seamlessly increasing the data rate of the established data communication link using the determined actual parameter value to provide a steady state communication link with an updated data rate.

According to another exemplary embodiment of the invention, ADSL DMT systems and methods are provided that establish a data communication link during initialization and that change the data transmission bit rate parameters in a seamless manner during initialization. The ADSL DMT systems and methods operate according to protocols that allow the seamless change of transmission bit rates during initialization and this seamless change of transmission bit rates may be initiated by either the transmitter or the receiver, e.g., the CO or the CPE modem.

These and other features and advantages of this invention are described in, or are apparent from, the following detailed description of the embodiments.

BRIEF DESCRIPTION OF THE DRAWINGS

The embodiments of the invention will be described in detail, with reference to the following figures wherein:

FIG. 6 illustrates an exemplary embodiment of an ADSL frame and R-S codewords;

DETAILED DESCRIPTION OF THE INVENTION

Figure 2:
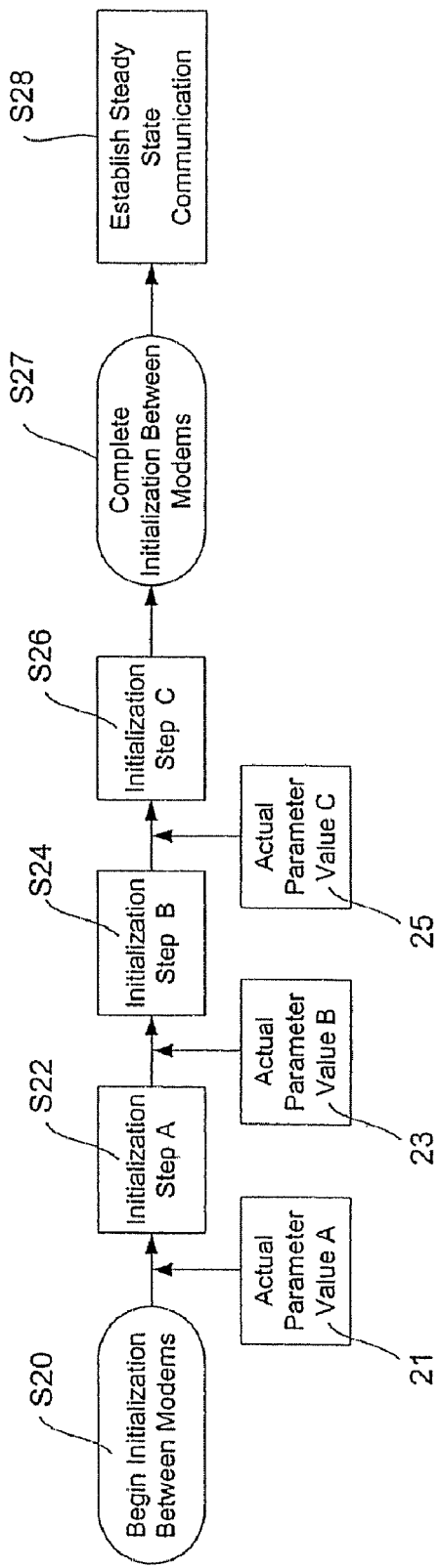
FIG. 2 is a functional block diagram illustrating a standard initialization procedure.
Figure 3:
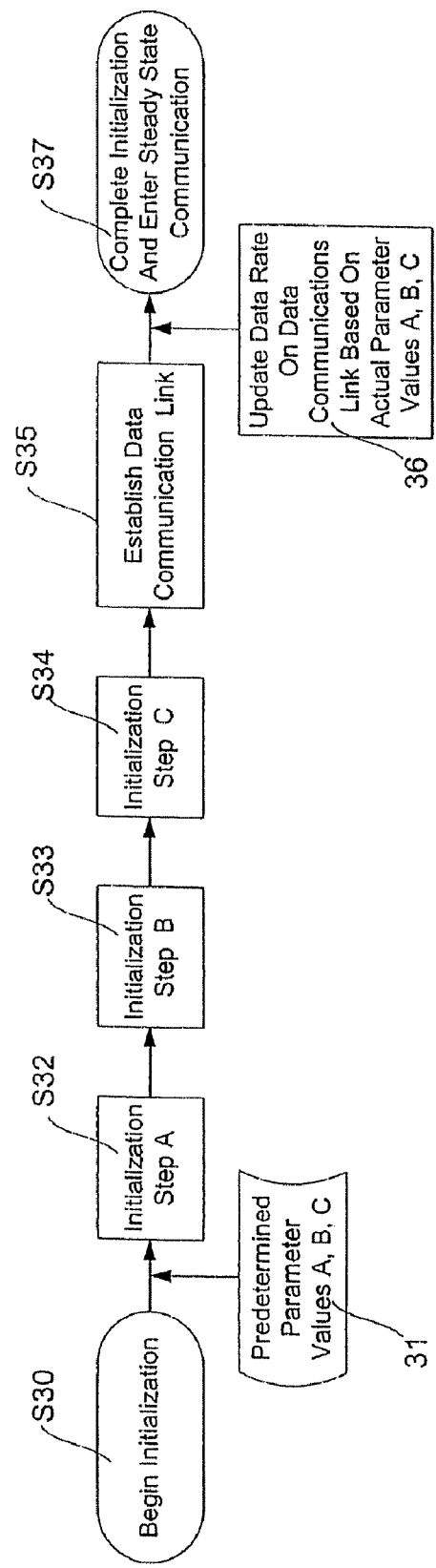
FIG. 3 is a functional block diagram illustrating an initialization procedure in accordance with one embodiment of the present invention.

FIG. 3 is a functional block diagram illustrating an initialization procedure in accordance with an exemplary embodiment of the present invention. As can be seen, the full initialization procedure is attained in a series of initialization steps where one or more of the previously noted parameter values that define the characteristics of the communication link between the transceivers are determined and used for establishing the communication link. However, in contrast to the standard initialization procedures such as that shown in FIG. 2, rapid establishment of a data communication link is made possible so that the user can quickly utilize the transmission system to transmit and receive data.

In particular, as can be seen in FIG. 3, the initialization of the transceivers in the transmission system is started in step S30. However, unlike the standard initialization procedure in which the actual parameter values are determined and initialization steps are executed in sequence using these actual parameter values, at least one predetermined parameter value such as the predetermined values A, B, and C, indicated by 31, are provided in accordance with the initialization procedure of an exemplary embodiment of the present invention. These predetermined values may be stored on one or more of the transceivers or other storage devices. These predetermined parameter values A, B, and C are used for the various initialization steps S32, S33, and S34, respectively, to allow quick establishment of a data communication link in step S35. Of course, in other examples, there may be fewer or additional steps, three steps being shown here as an example only. When such data communication link is established as indicated by step S35, the communication system is functional and the user may utilize the transmission system to transmit and receive data.

Moreover, it should again be noted that these initialization steps are illustrated generically since they depend on the particular initialization standard followed. For instance, in initialization step S32, an information exchange procedure between the transceivers may be performed to indicate that a communication link is desired between the transceivers. In initialization step S33, a channel between the transceivers that is available for use in establishing the communication link may be determined. The initializing step S34 may be the step in which the transceivers are trained. Of course, in other embodiments, these initialization steps may entail different, additional or a lesser number of specific steps.

It should be appreciated that because the data communication link established in S35 in accordance with an exemplary embodiment of the present invention utilizes predetermined parameter values 31 instead of the actual parameter values, the data rate or capacity of the communication link is not necessarily optimized. Therefore, the data rate of the communication link established using the predetermined parameter values could be higher or lower than the data rate attained when the actual parameter values are used. In the case when the data rate is higher than can be attained when the actual parameters are used, the connection can be established at a bit error rate that is higher than expected. For example, if the BER is expected to be 1E-7, as is in most conventional ADSL systems, connection at a higher data rate could result in a BER of 1E-5. This means that the received data will have, on average, 1 bit out of every 10000 bits in error, whereas it is desired to have 1 bit out of every 10,000,000 bits in error. Obviously operating at a data rate without achieving the required BER is a sub-optimum mode of operation. Nonetheless, in either case, whether the data rate is too high or too low, the user is allowed to use the transmission system to transmit and receive data, although possibly at a sub-optimum data rate.

To optimize the data rate of the communication link, subsequent to the establishment of the data communication link in step S35, the actual parameter values 36 corresponding to the predetermined values 31 are determined and the data rate of the established data communication link is seamlessly updated using the determined actual parameter values 36. The seamless updating of the data rate is attained, for example, utilizing Seamless Rate Adaptation techniques as described in further detail herein below. In this regard, an exemplary embodiment of the present invention allows, for example, such seamless adaptation of the data rate to be attained even while the user is transmitting and receiving data over the communications system. Once all the actual parameter values 36 are determined, and the data rate of the data communication link established in step S35 is seamlessly adapted using the determined actual parameter values 36, the initialization procedure between the modems is completed in step S37 and the modems enter steady state communication.

Again, the exemplary predetermined parameter values 31 and the corresponding actual parameter values 36 include those parameter values that define the characteristics of the communication link between the transceivers of the transmission system, and are preferably required for the establishment of the data communication link. In this regard, the predetermined parameter value 31 may be bit error rate, bit allocation value, a gain value, or such parameter value(s) that have been grouped together such as in bit allocation tables and/or gain tables as well as other parameters including a signal to noise ratio (SNR). Moreover, the predetermined parameter value 31 may also be overhead bits of EOC and AOC channels, a codeword size, number of parity bits in a codeword, depth of an interleaver, size of an ADSL frame, and overhead framing bytes. Alternatively, or in addition, the predetermined parameter values 31 may be the channel SNR, the time domain equalizer filter taps, the frequency domain equalizer filter taps and the echo canceller filter taps.

Of course, these are merely examples of parameter values and are not exhaustive. In this regard, in other exemplary embodiments, the predetermined parameter values may also merely be pointers that point to a particular predetermined parameter value or set of values to be used, the predetermined parameter(s) being stored in a storage device accessible by one or more of the modems of the communications system. Moreover, in yet other exemplary embodiments, the predetermined parameter values may even be functions or equations that provide estimates or approximations of the actual parameter values based on various known or determinable actual parameter values. As to which parameter values are provided in the predetermined parameter value 31 is largely dependent on the design of the transmission system and the standard used, such design and standard determining the parameter values required to establish the data and steady state communication link.

Thus, for the transceivers in the ADSL transmission system that utilize the initializing procedure in accordance with the present invention as shown in FIG. 3, a data communication link is established much faster than conventional modems that utilize standard initialization procedures which require determination of the actual parameter values to complete full initialization prior to the establishment of any communication link. By providing predetermined parameter values 31 and using these values for the initialization steps and quickly establishing the data communication link in step S35, the delay which would result in determining the actual parameter values can be avoided.

Moreover, the seamless rate adaptation techniques allow the data rate of the communication link between the modems of the transmission system to be seamlessly adapted without requiring disruption in the communication link or requiring full initialization. In this manner, the initialization period during which the user is precluded from using the system is greatly reduced from, for example, 10 seconds to approximately 1 second or even less. Although the transceivers may transmit and receive data at sub-optimum data rates, this disadvantage may be quickly overcome by seamlessly modifying the data rate after data transmission and reception are underway.

Figures 4, 5:
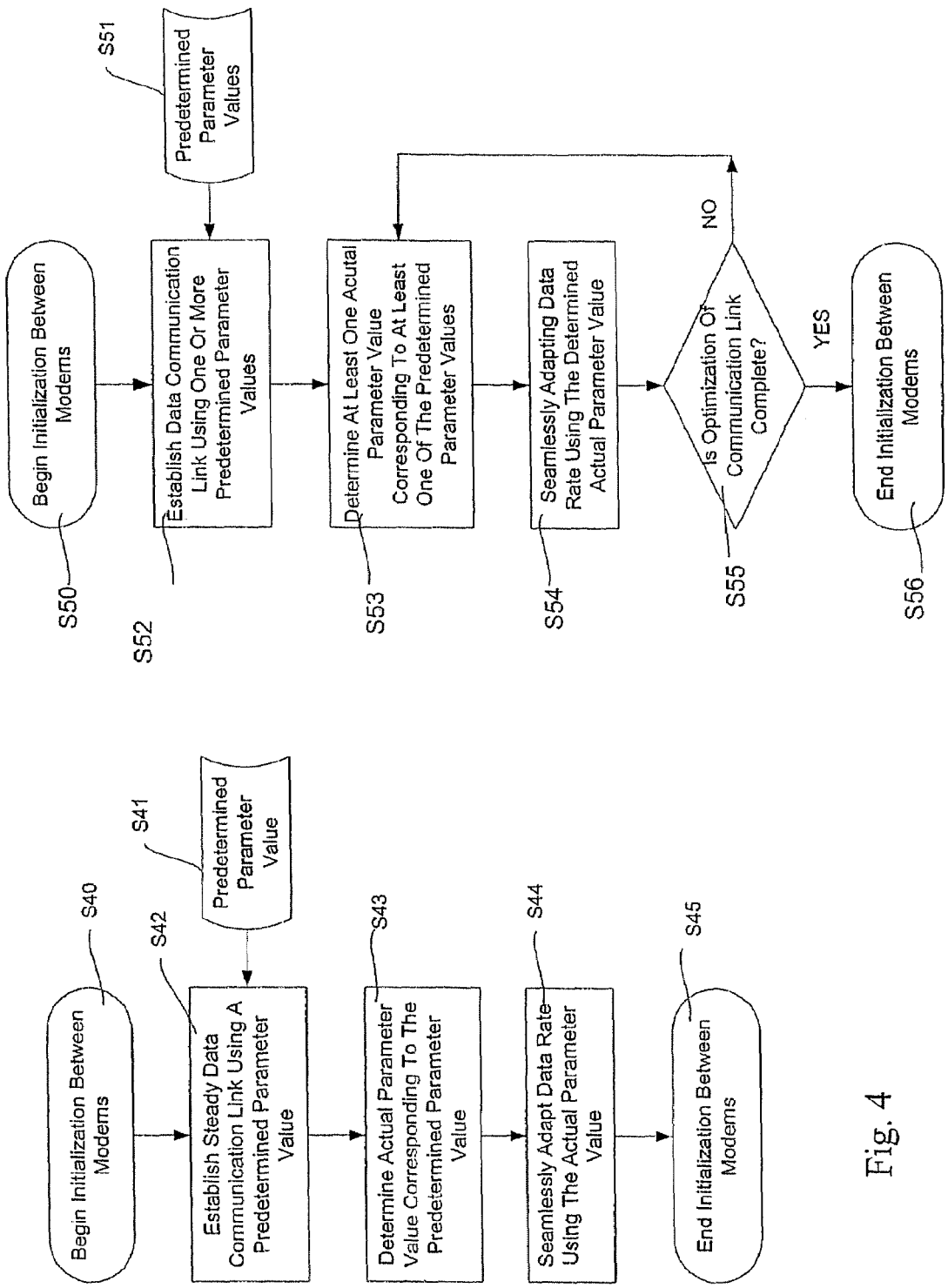
FIG. 4 is a flowchart outlining a method of initializing modems in a multicarrier transmission system in accordance with one embodiment of the present invention.
FIG. 5 is a flowchart outlining a method of initializing modems in a multicarrier transmission system in accordance with another embodiment of the present invention.

FIG. 4 shows a flowchart outlining a method of initializing modems in a multicarrier transmission system in accordance with an exemplary embodiment of the present invention which may be used to establish a communication link therebetween.

Upon beginning the initialization in step S40, the method includes the step S41 of providing at least one predetermined parameter value that approximates a corresponding actual parameter value of the communication link between the transceivers. Predetermined parameter values can be generated in a number of ways. For example the actual parameter values from a previously completed standard initialization may be used as predetermined parameter values. Alternatively, for example, predetermined parameter values may be determined by using the lowest possible actual value for a parameter, e.g., using a 1 bit constellation on a subchannel.

Alternatively, the predetermined parameter value may actually be an estimated parameter value based on partial training or the inaccurate measurement of initialization functions. For example the predetermined parameter value may be a bit allocation table that is generated based on a partial inaccurate SNR measurement. A partial SNR measurement is accomplished if, for example, the SNR is measured over a short period of time, e.g., less than 1 second in ADSL systems. In this case the bit allocation table based on the inaccurate SNR measurement would be sub-optimum and would therefore need to be adapted by seamlessly adapting the bit allocation table to achieve the optimum data rate.

Alternatively still, for example, the transceivers can monitor one or more characteristics of the line and/or the transmitted or received data, store this data, and either increase or decrease the data rate through an initialization according to the principles of this invention to maintain the communications link. Furthermore, for example, profiles of various parameter value sets can be stored such that in anticipation of certain conditions, such as varying line conditions that may occur, the transceivers can preemptively initialize and update based on the stored parameter sets.

The provided at least one predetermined parameter value is used to establish a data communication link between the modems of the transceivers. As previously explained, the at least one predetermined parameter value is used as an approximation of the actual parameter value. The data communication link established in step S42 using the predetermined parameter value allows the user to transmit and receive data between the transceivers. Of course, the data communication link established using the at least one predetermined parameter value has a data rate that may be different, e.g., greater or lesser, than a data rate obtained when the actual parameter value corresponding to the at least one predetermined parameter value is used. In step S43, the actual parameter value corresponding to the at least one predetermined parameter value is determined. Then, using the actual parameter value determined in step S43, the data rate of the established data communication link is seamlessly adapted in step S44 to provide an updated communication link, for example, a steady state communication link, e.g., showtime, with a different data rate. In the illustrated embodiment, the initialization between the modems is then completed in step S45.

Of course, in other exemplary embodiments, the at least one predetermined parameter value may actually be A plurality of predetermined parameter values that approximate a plurality of actual parameter values, these actual parameter values being determined and used to seamlessly adapt the communication link's data rate. In this regard, FIG. 5 shows a flowchart outlining an exemplary method of initializing modems in a multicarrier transmission system in accordance with another embodiment of the present invention. Again, the initialization starts in step S50 and a plurality of predetermined parameter values are provided in step S51, which are used to establish a data communication link in step S52. Once the data communication link is established in step S52, at least one actual parameter value corresponding to at least one of the predetermined parameter values is determined in step S53. Then, using the actual parameter value determined in step S53, the data rate of the established data communication link is seamlessly adapted in step S54 to provide a steady state communication link with an updated, for example, optimized, data rate.

As can be seen, a determination is then made in step S55 as to whether the optimization of the communication link is complete. In this regard, optimization as used here refers to the change in data rate of the communication link to the data rate that would be attained by a communication link established using the determined actual parameter values. In the illustrated embodiment, this step is present because a plurality of predetermined parameter values are provided and the plurality of actual parameter values will be determined. This allows the step of seamlessly adapting the data late of the communication link to be performed numerous times in an iterative manner as one or more of the actual parameter values are determined. For instance, it may be desirable to iteratively adapt the data rate of the communication link as the actual parameter values are determined. Thus, rather than waiting for all of the actual parameter values to be determined before modifying the data rate to an optimized data rate, when one or more of the actual parameter values are determined, the data rate of the communication link may be updated using only those actual parameter values that have been determined.

Of course, the adapted data rate of the communication link partly using some of the predetermined parameter values and partly using the determined actual parameter values could be less than data rate attainable in a communication link established using all actual parameter values. Nonetheless, this provides the user of the transmission system better data rate performance than that attained in the initial communication link established using only the predetermined parameter values. Moreover, subsequent to this adaptation, the data rate, or other actual parameter values may be determined and the data rate of the communication link seamlessly adapted again based on the newly determined actual parameter values.

Thus, the steps of determining each of the plurality of actual parameter values and seamlessly adapting the data rate of the communication link using the plurality of actual parameter values may be attained iteratively for each of the plurality of actual parameter values. This iterative determination of whether optimization of the communication link is complete is made until it is determined that optimization is completed which leads to the ending of the initialization between the modems in step S56.

In this manner, rapid initialization of the modems may be attained so that a data communication link can quickly be established therein between. Moreover, the data rate of the established communication link is seamlessly adapted as the actual parameter values are determined thereby improving the performance of the multicarrier transmission system.

For example, the bit allocation table (BAT) can be the predetermined parameter set. As an example, this predetermined BAT can be based on the BAT that was generated during a previous full initialization. In a standard initialization, the BAT is generated after measuring the SNR of the channel using long training sequences. These training sequences can take, for example, more that 4 seconds. In a fast initialization the SNR can not be measured using such a long training sequence since the fast initialization sequence will typically last less than 4 seconds. Therefore, the BAT of the previous full initialization is used as a predetermined parameter set for the fast initialization and a data connection is established using this predetermined BAT. Since the channel may have changed since the last full initialization, the predetermined BAT may not be optimum for the current connection. This means that the data rate resulting from the use of this BAT may either be too low, because the channel conditions (SNR) have improved, or too high, because channel conditions (SNR) have worsened. In either case, the SNR of the channel is measured over the data communication link connection over the required measurement period which is typically, for example, greater than 4 seconds. After the SNR is measured more accurately the actual BAT can be generated and the system can be modified to use the actual BAT. This is accomplished by seamlessly adapting the data rate and using the new BAT for communication to establish a steady state connection.

The systems and methods of this invention will also work equally well when a partial training is performed. With a partial training, a combination of actual parameter values and predetermined parameter values are used. Again, the predetermined parameter values can be retrieved from a storage location and based on any one or more of a previously used parameter value, a fixed parameter value, a estimated parameter value, a dynamically determined parameter value, or the like. For example, the system may know that a certain actual parameter will be difficult and time consuming to determine, for example, the SNR. Thus, the system could use a predetermined parameter value for the SNR, allow data communication, and determine the actual parameter values for the remaining parameters, thus completing initialization. This approach would also lead to at least an initialization time savings over that of a conventional full initialization.

The principles of the invention may be employed using transceivers that include a transmitter, such as that discussed above in relation to FIG. 1, and a receiver. In general, an ADSL system includes both a transmitter and a receiver for communication in a particular direction. In the discussion that follows, an ADSL DMT transmitter accepts data and transmits data over a transmission line, which can be, for example, a twisted wire pair, or the like. A transmission can also occur over a medium that includes other kinds of wires, fiber optic cable, wireless links, or the like. In order to utilize the transmitted signal, a second transceiver at the remote end of the transmission line includes a receiver that converts the received analog signal into a digital data stream for use by devices, such as computers, digital televisions, digital radios, communications equipment, or the like. For bi-directional communication using a pair of transceivers, each transceiver includes a transmitter that sends information to the receiver of the other member of the pair, and a receiver that accepts information transmitted by the transmitter of the other member of the pair.

As discussed herein, the exemplary DMT system has the capability of adapting the system bit rate on-line, during initialization, in a seamless manner. The DMT system also provides a robust and fast protocol for completing this seamless rate adaptation. The DMT system also provides a framing and encoding method with reduced overhead compared to conventional DMT systems. This framing and encoding method enables, for example, a system with a seamless rate adaptation capability.

The specific details of methods for seamlessly adapting the data rate of the established communication link as set forth in steps S44 in FIG. 4 and S54 in FIG. 5 is discussed herein below. In this regard, various methods for seamlessly adapting the data rate during initialization of the modems are generically described and various examples are also discussed in U.S. application Ser. No. 09/522,870 filed Mar. 10, 2000 entitled "A Method for Seamlessly Changing Power Modes and ADSL Systems," U.S. patent application Ser. No. 09/522,869, filed Mar. 10, 2000 entitled "Seamless Rate Adapted Adaptive Multicarrier Modulation System and Protocols," U.S. patent application Ser. No. 09/523,086, filed Mar. 10, 2000 entitled "A Method for Synchronizing Seamless Rate Adaptation,", and U.S. patent application Ser. No. 09/918,033 filed Aug. 1, 2001 entitled "Systems and Methods for Transporting a Network Timing Reference in an ADSL System", all of which are incorporated herein by reference in their entirety.

It is highly desirable that this adaptation of the data rate between the modems occur in a "seamless" manner, i.e., without data bit errors or an interruption in service. However, the DMT ADSL modem specified standards are not capable of performing seamless data rate adaptation. Thus, the following discussion provides the details of how the data rate of the communication link may be seamlessly increased using various SRA methods described to provide a data communication link with an updated data rate.

Condition 4 described above does not allow the size of the BAT to change without modifying the R-S coding, interleaving and framing parameters. If the BAT and $N_{BAT}$ could be modified during operation, i.e., if more or fewer bits were allocated to carriers in a DMT symbol, the data rate could be changed. Condition 4 requires that when the number of bits $N_{BAT}$ in the BAT changes, the size of the R-S codeword, and therefore the interleaving parameters, must also be modified. Modifying the interleaving and coding parameters on-line requires the re-initialization of the interleaver. Re-initialization of the interleaver always results in a "flushing" of the interleave memory. This flushing of the memory results in data errors and the transition not being seamless.

In order to allow a DMT ADSL transmission systems to change the data rate seamlessly, such as during initialization of the modems, the framing and encoding of the data must be efficient such that there is less overhead data bits per DMT symbol which thereby increases the data bit rate. Additionally, the ADSL system must be able to dynamically adapt to the data rate in a seamless manner. Furthermore, there must exist a robust and fast protocol for completing such a seamless rate adaptation such that the data rate change can occur successfully even in the presence of high noise levels.

As discussed hereinafter, and in the co-pending related applications, an exemplary framing method is disclosed that decreases the overhead, i.e., non-payload data in a DMT ADSL system.

FIG. 6 illustrates an ADSL frame and R-S codeword 200 that comprises at least one framing overhead byte 210, one or more payload bytes 220 and one or more checkbytes 230. This framing method enables seamless rate adaptation. As discussed above, current ADSL systems place restrictions and requirements on the ADSL frames, R-S codewords, and DMT symbols. This configuration as shown in FIG. 6 allows for the de-coupling of the ADSL frames and the R-S codewords from the DMT symbols. This de-coupling results in a system that has, for example, lower overhead data per DMT symbol and can also complete data rate adaptations in a seamless manner. Thus, the ADSL frames and the R-S codewords are constructed to have the same length and to be aligned. The R-S codeword is made sufficiently large to maximize the coding gain. The size of the R-S codeword, and therefore the ADSL frame, can be negotiated at, for example, the beginning of initialization or predetermined in advance. A fixed number of R-S checkbytes and overhead framing bytes are included in an ADSL frame. These parameters can also be negotiated at the beginning of initialization or predetermined in advance.

Unlike conventional DMT symbols, the DMT symbols produced in accordance with the exemplary embodiment of this invention are not aligned with the ADSL frames and the R-S codewords. Additionally, the number of bits in a DMT symbol depends solely on the data rate requirements and configurations, and is de-coupled from the R-S codeword size, the interleaver depth, and the ADSL frame size.

The number of bits in a DMT symbol dictates the data rate of the modem independently of the other framing, coding or interleaving restrictions. Since overhead bytes are added at the ADSL frame layer, a DMT symbol does not necessarily contain a fixed number of overhead bytes. As the data rate gets lower, for example, 128 kbps, the overhead data remains low. In particular, this framing method assigns a fixed percentage of overhead data to the data stream, rather than a fixed number of overhead bytes. This percentage does not change when the data rate of the modem changes, as in the case with current ADSL modems. Consider the following examples of conventional standard compliant framing methods:

CONVENTIONAL EXAMPLE #1

The line capacity is 192 bytes per DMT symbol (6.144 Mbps). The codeword size is 192, which includes 16 checkbytes and one overhead framing byte, assuming ANSI T1.413 Framing Mode No. 3. The total framing overhead, i.e., checkbytes plus overhead framing bytes, per DMT symbol is 16+1=17. Therefore, the framing overhead is $17/192$=8.8 % of the available throughput. In this case, the framing overhead is reasonable.

CONVENTIONAL EXAMPLE #2

The line capacity is 4 bytes (128 kbps). The codeword is constructed from 16 DMT symbols and is 16×4=64 bytes. There are 16 R-S checkbytes, one checkbyte per DMT symbol, and there is one overhead framing byte, assuming ANSI T1.413 Framing Mode No. 3. The total framing overhead, i.e., checkbytes plus overhead framing bytes, per DMT symbol is 1+1=2 bytes. Therefore the framing overhead is $2/4$=50% of the available throughput. This is highly inefficient.

Examples of embodiments of the framing method that may be used to implement this invention provide the following results, called the constant percentage overhead method:

EXAMPLE #1

This is exactly the same as the standard compliant training example, i.e., conventional example #1 above. The codeword sizes, DMT symbol sizes and overhead are the same. Therefore, the framing overhead is $17/192=8.8\%$ of the available throughput.

EXAMPLE #2

The line capacity is 4 bytes (128 kbps). The codeword is constructed independently of the DMT symbol and therefore could be, for example, set to 192 bytes. This is also the size of the ADSL, frame. Sixteen R-S bytes and one overhead framing byte per codeword or ADSL frame are used. There are $192/4=48$ DMT symbols in one codeword. The total overhead, i.e., checkbytes plus overhead framing bytes, per 48 DMT symbols is $1+16=17$ bytes or $17/48=0.35$ bytes per one DMT symbol. The framing overhead is thus $0.35/4=8.8\%$ of the available throughout.

Accordingly, from Examples 1 and 2 above, it is apparent that a method of achieving a framing overhead that is a constant percentage of the available throughput may be used, regardless of the data rate or the line capacity. In these exemplary scenarios, the framing overhead was 8.8% for both 6 Mbps and 128 kbps.

Another exemplary benefit of the framing method described herein is that it enables seamless data rate adaptation during initialization. Seamless Rate Adaptation (SRA) is accomplished by changing the DMT symbol BAT, i.e., the number of bits allocated to each subchannel in the multicarrier system. As shown above, modifying the BAT changes the number of bits per DMT symbol and results in a change in the data bit rate of the system. In an exemplary embodiment, the DMT symbol size is changed without modifying any of the R-S coding, interleaving and/or framing parameters. This is possible because the constant percentage overhead framing method described above removes the restrictions imposed by the prior art on the relation between the DMT symbols and the R-S codewords or ADSL frames. Since the R-S coding and interleaving parameters do not change, interleaver flushing and other problems associated with changing the parameters associated with these functions do not occur. Thus, the transceiver can adapt the data rate without errors or service interruption through an updating of the BAT.

A BAT should be updated at the transmitter and the receiver at exactly the same time, i.e., on exactly the same DMT symbol. If the transmitter starts using a new BAT for transmission before the receiver does, the data is not demodulated correctly and bit errors can occur. Also, if the receiver changes to a new BAT before the transmitter does, the same errors can occur. For this reason, the transition to the use of the updated BAT for transmission and reception needs to be synchronized at the transmitter and the receiver. In an exemplary embodiment, a protocol is provided that enables the synchronized transition to the use of an updated BAT.

It is also important that, for example, this protocol be robust in the presence of channel noise. For example, if the protocol fails and the receiver does not switch to the updated BAT at the same time as the transmitter, then bit errors occur and the transition is not seamless. Furthermore, if the transmitter and receiver are using different BATs, it is difficult to re-establish an error-free link without performing a re-initialization of the connection, which results in an interruption of service of up to, for example, ten or more seconds as previously described.

It is also important that the transition between the BATs occur very quickly, since the need to operate at a new data rate during initialization is almost instantaneous.

Accordingly, the SRA protocol should at least provide a method for synchronizing the transceivers to the updated BAT, a robust transition to the new data rate and a fast transition to the new data rate.

Two exemplary protocols are provided that satisfy these requirements for seamless rate adaptation during initialization, in particular, to seamlessly increase the data rate of the established communication link as set forth in step S44 in FIG. 4 and step S54 in FIG. 5. The first protocol is the normal SRA (NSRA) protocol and the second protocol is the fast SRA (FSRA) protocol.

Figure 8:
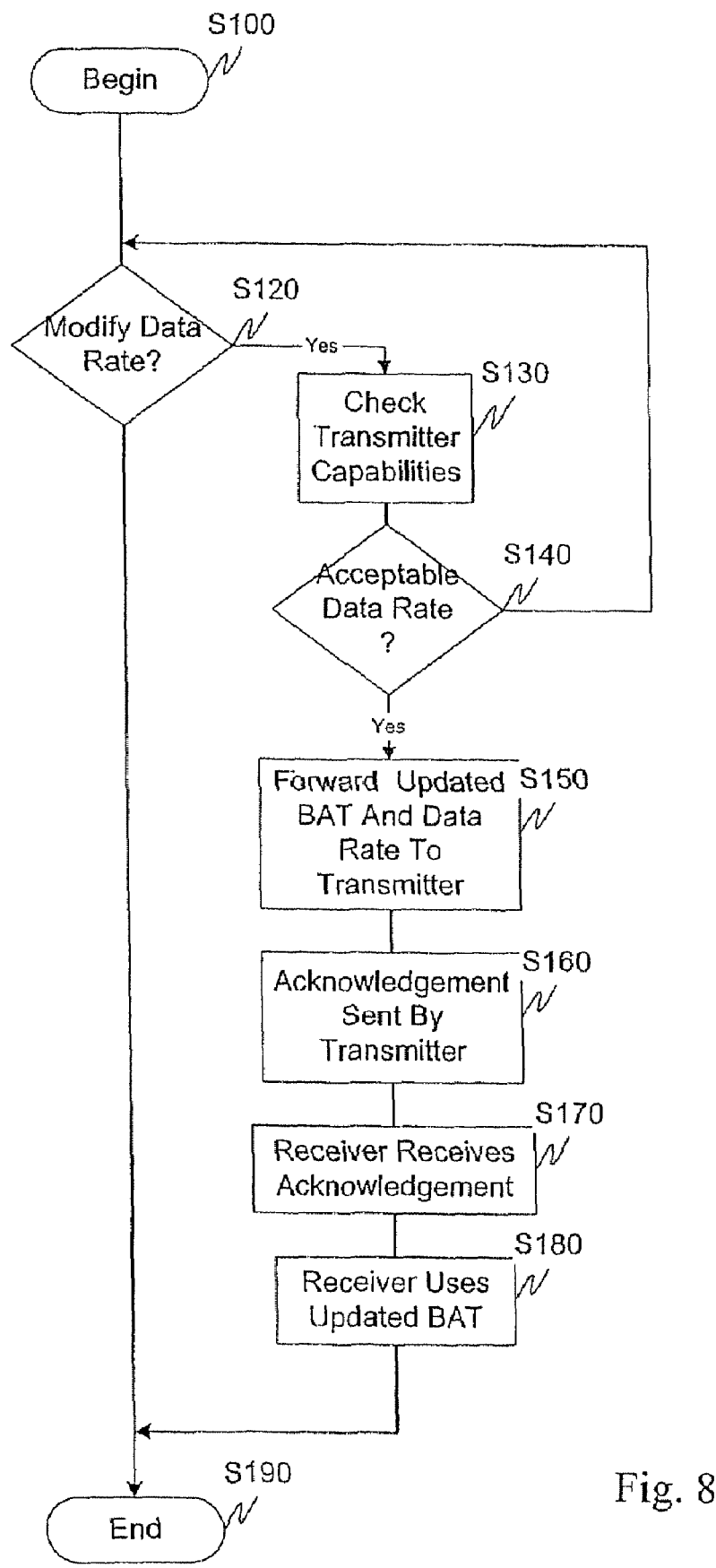
FIG. 8 is a flowchart outlining an exemplary method of a seamless rate adaptive transmission.
Figure 9:
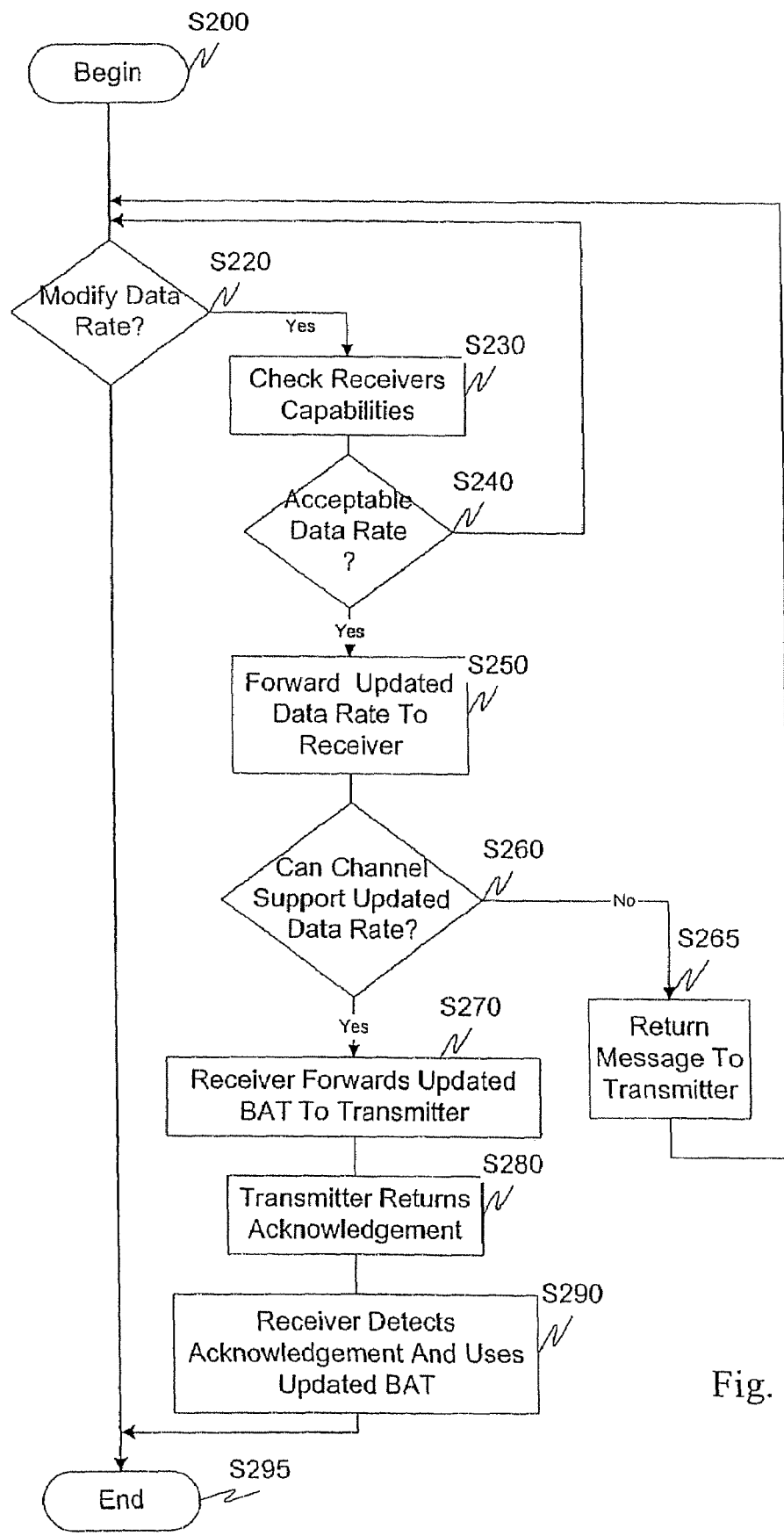
FIG. 9 is a flowchart outlining a second exemplary method of seamless rate adaptive transmissions.

In the normal SRA protocol (NSRA), either the transmitter or the receiver of the transceiver can initiate this method as illustrated in FIGS. 8-9. In particular, for receiver initiated SRA, control begins in step S100 and continues to step S120, in which during the initialization, a receiver determines whether the data rate should be modified, i.e., increased or decreased. If the data rate is to be modified, control continues to step S130. Otherwise, control jumps to step S190, where the control sequence ends.

In step S130, the capabilities of the transmitter are checked based on the determined modified data rate. The data rate may be modified because, for example, the channel conditions on the desired Bit Error Rate has changed. Then, in step S140, a determination is made whether the updated data rate is within the transmitter's rate capabilities. If the updated data rate is within the transmitter's capabilities, control continues to step S5150. Otherwise, control jumps back to step S120.

In step S150, data rate and the updated BAT, which in this case is the determined actual parameter value, are forwarded to the transmitter using, for example, the AOC or EOC channel. This corresponds to an "NSRA Request" by the receiver. Next, in step S160, the transmitter receives the "NSRA Request" and uses an inverted synchronization (SYNC) symbol as a flag to signal the receiver that the updated BAT is going to be used. The updated BAT is used for transmission on the first frame, for a finite number of frames, following the inverted SYNC symbol. The inverted SYNC symbol operates as a rate adaptation "SRA GO" message sent by the transmitter. Then, in step S170, the receiver detects the inverted SYNC symbol, "SRA GO," and the updated BAT is used for reception on the first frame, or for a finite number of frames, following the inverted SYNC symbol. Control then continues to step S190, where the control sequence ends.

FIG. 9 illustrates the method of performing a transmitter-initiated NSRA during initialization. In particular, control begins in step S200 and continues to step S220, where the transmitter determines whether the data rate should be modified, i.e., increased or decreased. If the data rate is to be modified, control continues to step S230. Otherwise, control jumps to step S295 where the control sequence ends.

In step S230, having determined the modified data rate, the capabilities of the receiver are checked to determine if the desired data rate is within the receiver's rate capability. Next, in step S240, a determination is made whether the data rate is acceptable. If the data rate is acceptable, control continues to step S250. Otherwise, control jumps back to step S220.

In step S250, the transmitter forwards to the receiver the updated data rate using the EOC or AOC channel. This corresponds to an "NSRA Request" message. Next, in step S260, a determination is made, based on the NSRA request, whether the channel can support the new data rate. If the channel can support the new data rate, control continues to step S270. Otherwise, control jumps to step S265, where an "SRA DENY" message is sent back to the transmitter using, for example, the EOC or AOC channel.

In step S270, the receiver forwards the updated BAT which is the determined actual parameter value in this example, to the transmitter using, for example, the AOC or EOC channel based on the updated data rate. This corresponds to an "NSRA GRANT" request by the receiver. Next, in step S280, the transmitter receives the "NSRA GRANT" message and uses an inverted SYNC symbol as a flag to signal the receiver that the new BAT is going to be used. This new BAT is used for transmission on the first frame, or a finite number of frames, following the inverted SYNC symbol. The inverted SYNC symbol operates as a rate adaptation "SRA GO" message sent by the transmitter. Then, in step S290, the receiver detects the inverted SYNC symbol "SRA GO" and the updated BAT is used for reception on the first frame, or for a finite number of frames, following the inverted SYNC symbol.

The rate adaptation involves changing the number of bits in a DMT symbol by changing the BAT, and not the R-S codeword size, interleaver depth, or the ADSL frame size. This can be done without any interruption in data flow or an introduction of data errors.

This protocol is robust in that it does not use the EOC or AOC channel to send the "SRA GO" message for synchronizing the transition to the new data rate, such channels easily corrupting messages transmitted therein.

With the above methods, the "SRA GO" message is communicated via an inverted SYNC symbol. The SYNC symbol is defined in the ANSI and IT standards as a fixed non-data carrying DMT symbol that is transmitted every 69 symbols. The SYNC symbol is constructed by modulating all the DMT carriers with a predetermined PN sequence using basic QPSK (2-bit QAM modulation). This signal, which may be used throughout the modem initialization process, has a special auto-correlation property that makes possible the detection of the SYNC symbol and the inverted SYNC symbol even in highly noisy environments. An inverted SYNC symbol is a SYNC symbol in which the phase information in the QAM signal is shifted by 180 degrees. However, phase shifts other than 180 degrees of the SYNC symbol can be used equally well for the "SRA GO" message. Using the SYNC symbol for the "SRA GO" message makes the rate adaptation protocol very robust, even in noisy environments. However, in general, any symbol that can be detected in the presence of noise can be used in place of the SYNC symbol.

The Fast SRA (FSRA) protocol seamlessly changes the data rate on the line faster than the NSRA protocol. In the FSRA protocol, the predetermined parameter values are stored BATs which may be used to speed up the SRA and enable quick changes in the data rate. Unlike the profiles used in G.992.2, the stored BATs do not contain the R-S coding and interleaving parameters since these parameters are not affected when a data rate change occurs using the constant percentage overhead framing.

The BATs are exchanged using the NSRA method described in the previous section. After the one-time NSRA is complete, and a BAT that is based on the particular channel condition or application condition is stored by both transceivers, the FSRA protocol can use the stored BAT to complete fast on-line rate adaptation. Stored BATs are identified so that both the transmitter and receiver simply need to notify or point to the other transceiver which table is being used without actually having to transmit the information redundantly. For example, the stored BATs may be numbered. The transmitter or receiver simply needs to tell the other transceiver which BAT table number is to be used for subsequent transmission. As with the NSRA method, either the receiver or the transmitter can initiate the FSRA protocol.

Figure 10:
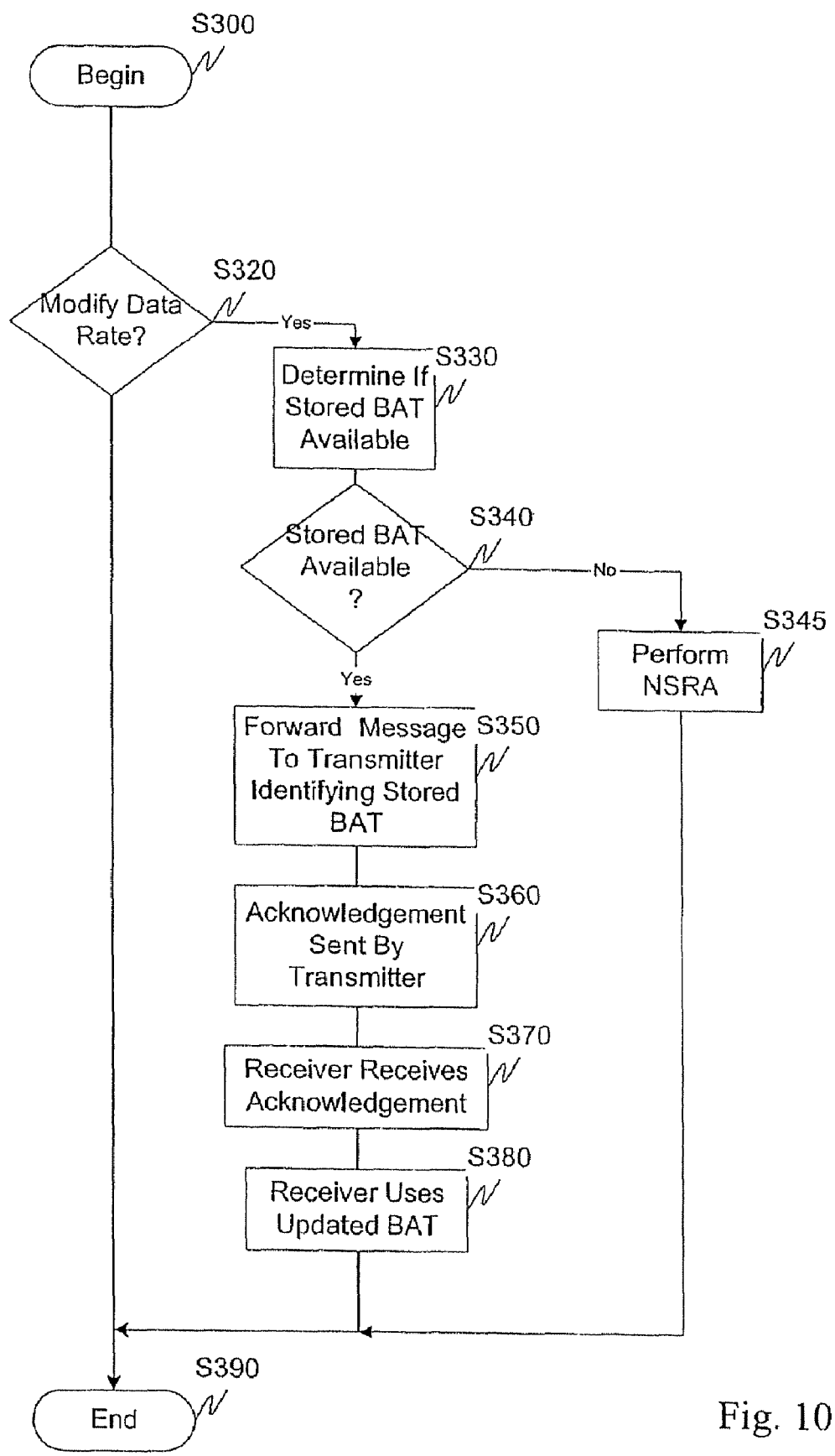
FIG. 10 is a flowchart outlining an exemplary method of fast seamless rate adaptive transmissions.

In particular, and with reference to FIG. 10, the receiver-initiated FSRA protocol commences in step S300 and continues to step S320 where a determination is made whether the data rate should be modified. If the data rate is to be modified, control continues to step S330. Otherwise, control jumps to step S390, where the control sequence ends.

In step S330, the receiver attempts to locate a stored BAT that matches the channel and/or application condition. Next, in step S340, a determination is made whether a stored BAT has been found that matches the conditions. If there is no stored BAT that matches the condition, control continues to step S345, where an NSRA is performed. Control then continues to step S390.

In step S350, if a BAT is found that matches the condition, the receiver sends a message to the transmitter specifying which stored BAT is to be used for transmission based on the new channel and/or application condition. This corresponds to an "FSRA Request" by the receiver. Next, in step S360, the transmitter receives the FSRA request and uses an inverted SYNC symbol as a flag to signal the receiver that the requested stored BAT will be used for transmission. The stored BAT is used for transmission on the first frame, or a finite number of frames, following the inverted SYNC symbol. The inverted SYNC symbol corresponds to a rate adaptation "SRA GO" message sent by the transmitter. Next, in step S370, the receiver detects the inverted SYNC symbol. Then, in step S380, the updated BAT is used for reception on the first frame, or for a finite number of frames, following the inverted SYNC symbol. Control then continues to step S390, where the control sequence ends.

Figure 11:
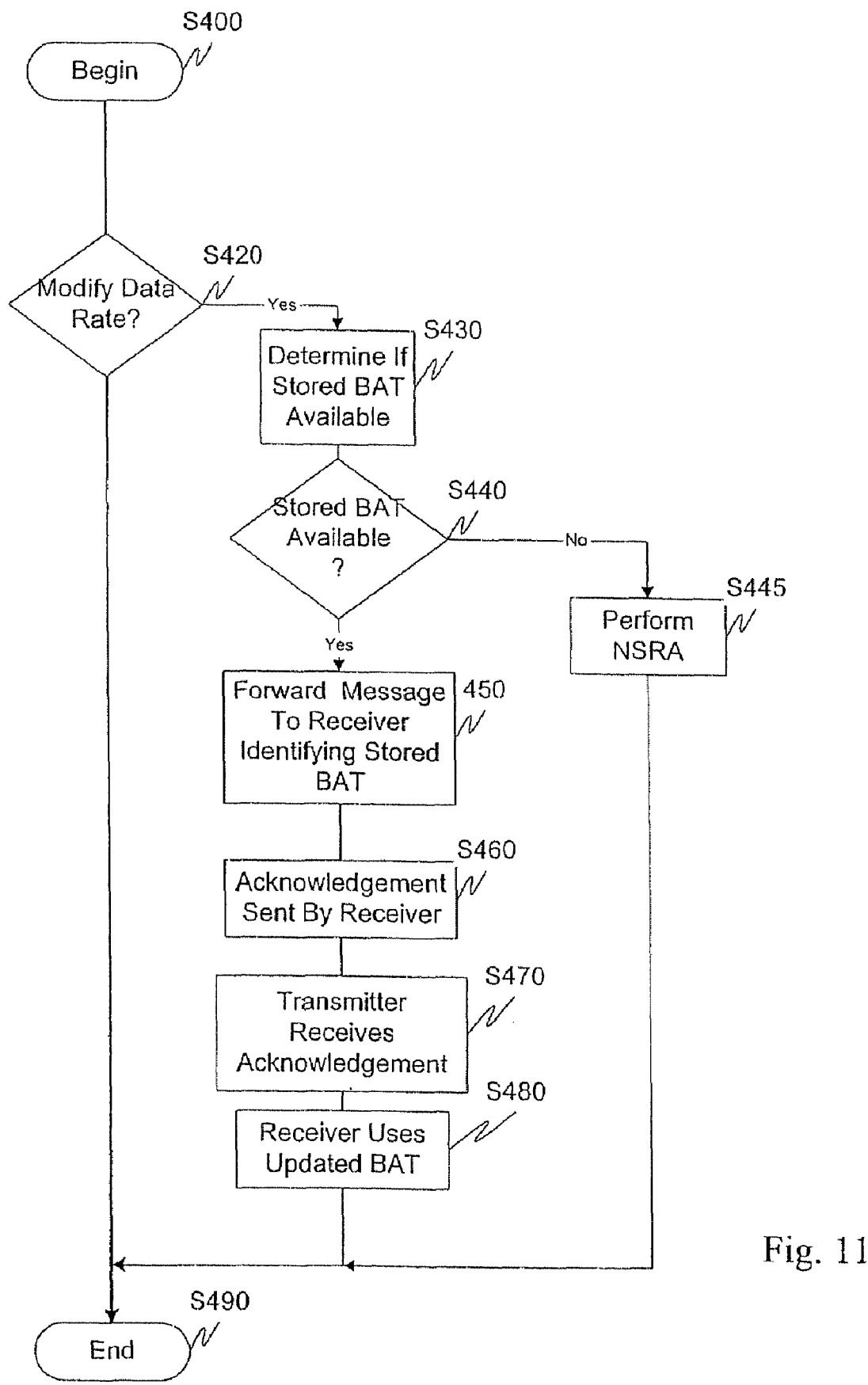
FIG. 11 is a flowchart outlining a second exemplary method of fast seamless rate adaptive transmission.

FIG. 11 illustrates a method of performing the fast seamless rate adaptive transmission bit rate changes which are transmitter initiated. In particular, control begins in step S400 and continues to step S420 where a determination is made whether the data rate should be modified. If the data rate is to be modified which, for example, matches a channel condition, control continues to step S440. Otherwise, control jumps to step S490, where the control sequence ends.

In step S430, the transmitter attempts to locate a stored BAT that matches the channel condition. Next, in step S440, a determination is made whether the stored BAT is available. If the stored BAT is not available, control continues to step S445 where the NSRA sequence is initiated. Control then continues to step S490.

However, in step S450, if a stored BAT matches the channel condition, the transmitter sends a message to the receiver specifying which stored BAT is to be used for transmission based on the channel and/or application condition. This corresponds to an FSRA request by the transmitter. Next, in step S460, the receiver receives the FSRA request and returns to the transmitter the FSRA Grant message to grant the FSRA request. Then, in step S470, the transmitter uses an inverted SYNC symbol as a flag to signal the receiver that the requested stored BAT will be used for transmission. Control then continues to step S480.

In step S480, the specified stored BAT is used for transmission on the first frame, or for a finite number of frames following the inverted SYNC symbol. The inverted SYNC symbol corresponds to a rate adaptation "SRA GO" message sent by the transmitter.

In step S480, the receiver detects the inverted SYNC symbol "SRA GO" and the stored BAT is used for reception on the first frame, or for a finite number of frames, following the inverted SYNC symbol.

The FSRA protocol can be completed very quickly. It only requires the exchange of two messages, i.e., the FSRA Grant and the FSRA Request and an inverted SYNC symbol. FSRA is faster than NSRA because, for example, the BAT is stored and need not be re-transmitted. As in the NSRA protocol, the FSRA protocol is also very robust in noisy environments since it uses an inverted SYNC symbol for the "SRA GO" message.

The SRA protocols described above may also be used to manage power during the initialization of modems of the transceivers. Full power mode is used during normal operations of the transceiver. Low power transmission modes are often used in transceivers in order to conserve power in cases when data does not need to be transmitted over the line. Many modems have low power modes or "sleep" modes that enable a transceiver to operate at a significantly lower power level when the transmission requirements are reduced. Many modems also have protocols that enable them to enter and exit these low power modes very quickly so that the user is not negatively effected by the modem's transition into the low power mode state. The SRA protocols provided of the invention are used to enter and exit from low power modes in a very fast and seamless manner. For instance, the modems of the transceivers may be first operated at a low power level to establish the communication link and then, the data rate of the communication links be increased by seamlessly in changing to an updated power level.

There are two basic types of low power mode (LPM). The first is Low Data Rate LPM is low power mode with a very low data rate (e.g. 32 kbps). Only a few of the subchannels are active. The data connection is maintained. The pilot tone may also be transmitted in order to maintain loop timing.

Another is the Zero Data Rate LPM which is a low power mode with an effectively 0 kbps data rate, i.e., no subchannels are modulating data. A data connection is not maintained. The pilot tone may also be transmitted in this case in order to maintain loop timing.

In both the Low Data Rate LPM and the Zero Data Rate LPM, the sync symbol, which is sent in normal full power mode every 69 symbols, may be on or off. If the sync symbol is still transmitted during the low power mode, the receiver can use the sync symbol to monitor for channel changes and other fluctuations on the line. However transmission of the sync symbol every 69 symbols can cause non-stationary crosstalk and could be detrimental to other signals on the same telephone wire or in the same wire bundle. If the sync symbol is not transmitted during low power mode, there is no non-stationary crosstalk on the telephone wire or the wire bundle. However, in this case the receiver is not able to monitor the channel with the sync symbol.

FSRA may be used to enter the low power mode during initialization of the modems in the transceivers. In one example, the receiver initiates the transition to low power mode using the receiver-initiated FSRA protocol. A receiver initiating the transition to low power mode uses a predetermined stored BAT corresponding to the low power mode. The stored BAT table for the low power mode may enable either a Low Data Rate LPM or a Zero Data Rate LPM. The low power mode BAT can be predetermined by the system or can be exchanged and stored using the NSRA process. In either case the receiver uses the receiver-initiated FSRA protocol to designate the low power mode BAT and synchronously switch to using that BAT for transmission.

The transmitter may also initiate transition into the low power mode. There are two exemplary ways the transmitter can use the transmitter-initiated FSRA protocol to enter into the low power mode. In one embodiment, the transmitter can use the entire transmitter-initiated FSRA process and request the transition. As in the case of receiver-initiated transition into low power mode, transmitter initiating the transition to low power mode uses a predetermined stored BAT for the low power mode. The stored BAT table for the low power mode can enable either a Low Data Rate LPM or a Zero Data Rate LPM. The low power mode BAT can be predetermined by the system or can be exchanged and stored using the NSRA process. In either case the transmitter uses the transmitter-initiated FSRA protocol to designate the low power mode BAT and synchronously switches to the low power mode using that BAT for transmission.

In a second exemplary embodiment, the transmitter can transition directly to send the inverted sync symbol to indicate transition into the low power mode during the transmitter initiated FSRA protocol described above. The receiver detects the inverted sync and transitions to the low power mode. In this case, since an FSRA request has not been sent by the transmitter, the receiver recognizes that an inverted sync symbol received without a FSRA request transmitted indicates that the transmitter is switching to low power mode. The low power mode BAT is predetermined by the system or is identifier and stored previously so that both the transmitter and the receiver use the BAT. In an alternative second embodiment, the transmitter sends a different signal that is predetermined by the transmitter and the receiver to be the signal used for transition into low power mode without an "FSRA request." For example, the transmitter may send a sync symbol with 45 degree phase rotation, rather than the inverted (180 degree) sync symbol. A sync symbol with a 45 degree phase rotation indicates that the transmitter is transitioning into low power mode using the stored BAT associated with the low power mode on the first frame, or a finite number of frames, following the sync symbol with a 45 degree rotation. The transmitter-initiated entry into low power mode as defined in the second embodiment has the advantage that it does not require the reverse channel to make the transition. The reverse channel is defined as the communications channel in the opposite direction, i.e., here, the communications channel used to send the FSRA messages from the receiver to the transmitter.

This is advantageous because the reverse channel may already be in low power mode with no data connection. If there is no data ready to be sent, the transmitter can simply transition to low power mode. This is an important power savings technique since the transmitter consumes a large portion of the power, as it is required to send the signal down the line. Transmitter-initiated transition into low power modes is also useful in "soft modem" (PC host based) implementations. In a soft modem implementation, the host processor is performing the modem transceiver functions and many other PC applications at the same time. If the host processor must perform another task that does not allow it to run the ADSL transmitter, the processor can quickly transition the transmitter to the low power mode by sending the inverted sync symbol, or the sync symbol with 45 degree rotation. After this the host processor resources can be consumed by the other task. The ADSL transmitter sends no signal (0 kbps) onto the line. The transmitter-initiated and receiver-initiated protocols described above enable the communication system to enter a low power mode in each direction (upstream and downstream) separately or in both directions together. The cases described above each focus on one direction. The protocols can be combined to accomplish transition in both directions at the same time. As an example, assume that the customer premise transceiver (CPT) is designed to enter into a low power mode in response to a PC that is also entering a similar state. The CPT first uses receiver-initiated low power mode transition to put the downstream (CO to CPT direction) into low power mode. Afterwards the CPT uses the transmitter-initiated low power mode transition to put the upstream (CPE to CO direction) into low power mode.

According to the SRA protocols, there are two embodiments the receiver can use to exit the low power mode during initialization of the modems of the transceivers. In the first embodiment, receive-initiated exit from low power mode can be accomplished using the receiver initiated NSRA or FSRA protocol if the low power mode still has at least a slow data connection in the reverse direction (low data rate LPM). This is necessary because the receiver must be capable of sending the SRA request back to the transmitter along with the BAT to be used. If the transmitter has not turned off the sync symbol in low power mode the NSRA or FSRA protocols would be used as described above. If the transmitter sync symbol is turned off while in low power mode, the "SRA Go" is sent by the transmitter by turning the sync symbol back on. The receiver detects the presence of the sync symbol (with or without inversion) as a flag to synchronize the change in data rate.

In a second embodiment, there is no data connection in the reverse direction (Zero Data Rate LPM). The receiver initiates an exit by first completing a "transmitter-initiated exit from low power mode (described below) in the reverse direction. This enables the data connection in the reverse direction. The receiver uses the receiver initiated NSRA or FSRA protocol to exit from low power mode in it's own direction. As described above, if the transmitter sync symbol is turned off while in low power mode, the "SRA Go" is sent by the transmitter by turning the sync symbol back on. The receiver detects the presence of the sync symbol (with or without inversion) as a flag to synchronize the change in data rate.

According to the SRA protocols, there are two embodiments the transmitter can use to exit from low power mode during initialization of the modems of the transceivers. In the first embodiment, the transmitter uses the entire transmitter initiated FSRA or NSRA process and requests the transition. This requires that there is a data connection in both directions (Low data rate LPM) so the protocol messages can be exchanged. As in the receiver-initiated exit from low power mode, if the transmitter has not turned off the sync symbol in low power mode the NSRA or FSRA protocols would be used as described above. If the transmitter had turned the sync symbol off while in low power mode, then the "SRA Go" is sent by the transmitter by turning the sync symbol back on. The receiver detects the presence of the sync symbol (with or without inversion) as a flag to synchronize the change in data rate.

In the second embodiment, the transmitter can exit the low power mode by sending the inverted sync symbol to indicate transition out of the low power mode. This requires that a sync symbol be sent during the low power mode. This protocol does not require a low data rate LPM. The receiver detects the inverted sync and exits the low power mode. The receiver is designed to recognize that an inverted sync symbol received without a FSRA request indicates the transmitter is exiting from low power mode. The full power mode BAT is identified and stored previously so that both the transmitter and the receiver have the BAT. For example, the BAT to be used upon exiting a low power mode can be defined by the system to default to the BAT of the last full power connection. Alternatively, the transmitter can send a different signal that is predetermined by the transmitter and the receiver to be the signal used for transition out of low power mode without an "FSRA request." For example, the transmitter can send a sync symbol with 45 degree phase rotation, rather than the inverted (180 degree) sync symbol. When the receiver detects the sync symbol with a 45 degree phase rotation, the receiver recognizes that the transmitter is transitioning out of low power mode using the stored BAT associated with the full power mode on the first frame, or a finite number of frames, following the sync symbol with a 45 degree rotation. If the transmitter had turned the sync symbol off while in low power mode, then the "SRA Go" is sent by the transmitter by turning the sync symbol back on. The receiver detects the presence of the sync symbol (with or without a phase shift) as a flag to synchronize the change in data rate.

Although throughout this description, the BAT is defined to be a table that specifies the number of bits allocated to each subchannel, the BAT can also contain other parameters associated with allocating bits to subchannels in a multicarrier system. An example of an additional parameter is the Fine Gain per subchannel as defined in the ANSI and ITU standards. In this case, when the BAT is exchanged during the NSRA protocol or the BAT is stored during the FSRA protocol, the BAT also contains the Fine Gain value for each subchannel.

The seamless rate adaptive system and associated protocols described above which may be used for seamlessly increasing the data late of the established communication link may also be applied to DMT systems that implement dual (or multiple) latency paths. A dual latency system is defined in the ITU and ANSI standards as a DMT system that supports two data streams with different latency specifications in the Framer/FEC block.

Figure 7:
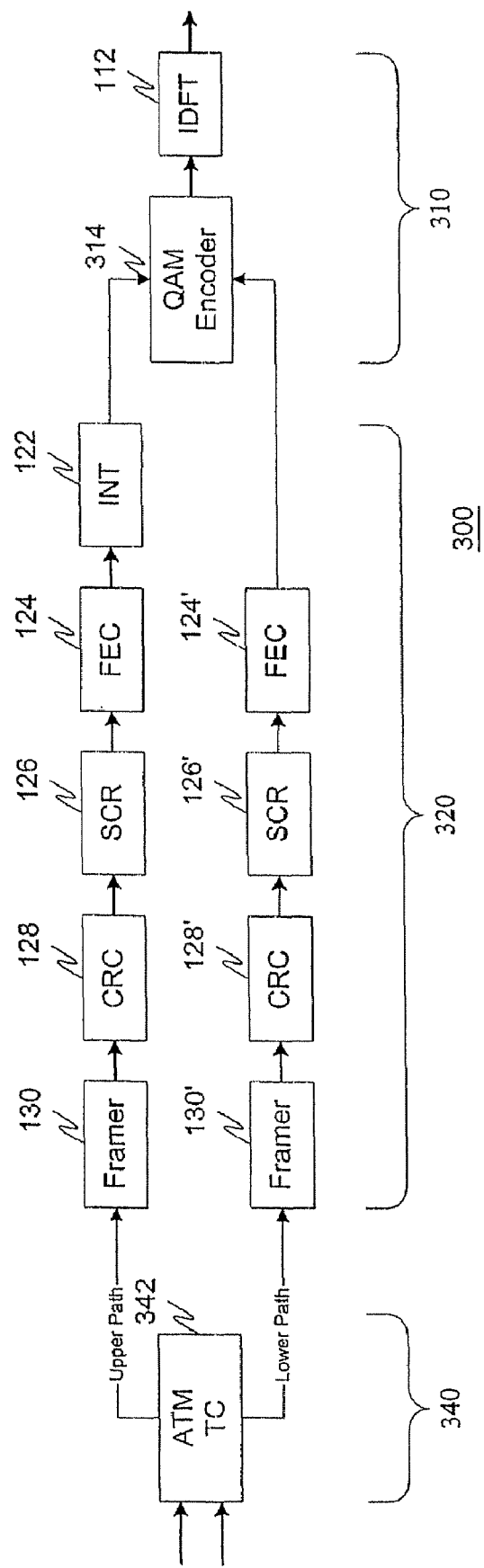
FIG. 7 is a functional block diagram illustrating an exemplary dual latency ADSL DMT transmitter.

FIG. 7 illustrates a standard ADSL DMT system 300 that implements dual latency, as an example of a system having a plurality of latencies. The system 300 includes three layers: the Modulation layer 310, the Framer/FEC layer 320, and the ATM TC layer 340, which are similar but not identical to the three layers described above in relation to FIG. 1.

The Modulation layer 310 provides the functionality associated with the DMT modulation. The DMT modulation is implemented using a Inverse Discrete Fourier Transform (IDFT) 112. The IDFT 112 modulates the bits from the dual input Quadrature Amplitude Modulation (QAM) 314 encoder into the multicarrier subchannels. The operation of the Modulation layer 310 is analogous to that of Modulation layer 110 of FIG. 1, with the difference that the Modulation layer 310 has multiple inputs, rather than only one input.

The Framer/FEC layer 320 shown in FIG. 7 has two paths. This layer contains a first path that includes the same portions as in the Frame/FEC layer 120 of FIG. 1, namely the Interleaving (INT) portion 122, the Forward Error Correction (FEC) portion 124, the scrambler (SCR) portion 126, the Cyclic Redundancy Check (CRC) portion 128 and the ADSL Framer portion 130. The layer further contains a second path that includes a second one of each of the Forward Error Correction (FEC) portion 124', the scrambler (SCR) portion 126', the Cyclic Redundancy Check (CRC) portion 128' and the ADSL Framer portion 130'. The Frame/FEC layer 320 provides functionality associated with preparing a stream of bits for modulation.

Figure 1:
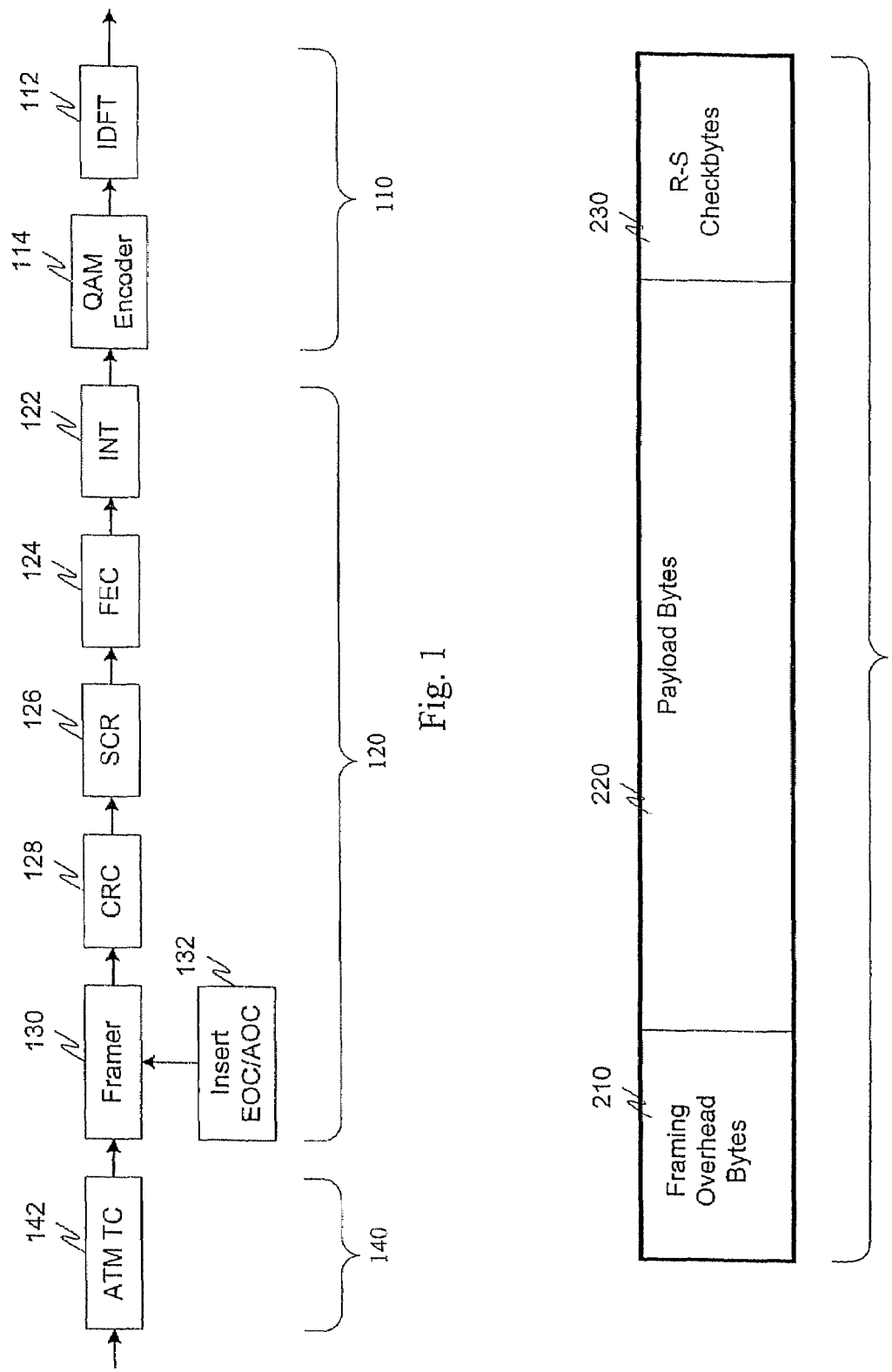
FIG. 1 is a functional block diagram illustrating a standard compliant ADSL DMT transmitter.

The lower path through the Framer/FEC layer 320 has a different amount of latency than the original upper path corresponding to FIG. 1, because the lower path does not perform interleaving on the data stream. Dual latency is used to send different bit streams with different latency requirements through the ADSL DMT modem. The ATM TC layer 340 includes an ATM TC portion 342 having multiple inputs and multiple outputs that transforms bits and bytes in cells into frames for each path.

The exemplary seamless rate adaptation system and method of the present invention also applies to a system with dual latency, or even multiple latencies. In the case of dual latency, the FEC and interleaving parameters for both paths are decoupled from the DMT symbol size. The BAT contains, in addition to the number of bits allocated to each subchannel, the data rate for each latency path in the form of bits per DMT symbol. When seamless rate adaptations are performed using the FSRA and NSRA protocols, the BAT also indicates the data rate for each latency path. For example, if the dual latency system runs with 1.536 Mbps on the interleaved path, e.g., a high latency upper path, and 256 kbps in the non-interleaved path, e.g., a low latency lower path, and an SRA is initiated, then the SRA protocol specifies the updated parameter value such as an updated BAT containing the number of bits per subchannel and also the new data rate for each latency path. At a 4 kHz DMT symbol rate, a system running at 1.536 Mbps+256 kbps=1.792 Mbps. 1792000/4000=448 total bits per symbol. The BAT specifies that 1536000/4000=384 bits per symbol are allocated to the interleaved path and 256000/4000=64 bits per symbol are allocated to the non-interleaved path. In the example, when an SRA is performed, the updated data rate for the interleaved path can be 1.048 Mbps, i.e., 1048000/4000=262 bits per symbol, and the new data rate for the non-interleaved path can be 128 kbps, i.e., 128000/4000=32 bits per DMT symbol, resulting in a total throughput rate of 1.176 kbps, or 294 total bits per DMT symbol. The NSRA and FSRA protocols combined with the framing method specified herein complete this data rate change in both latency paths in a seamless manner. It is also possible to not change the data rate on both latency paths.

These basic concepts can be expanded to encompass the transportation of a network timing reference (NTR) in an single or multiple latency ADSL DMT system. Specifically, the transportation of the NTR involves sending a timing reference signal from a CO modem to a CPE modem. This enables the CPE modem to reconstruct the network clock in order to send and receive signals or applications that are synchronous to the network clock, such as voice over DSL.

As discussed above, the framing layer is decoupled from the modulation layer. As a result, the NTR signal cannot be inserted at the framing layer as is done in the current ADSL standards specified in the ITU and ANSI. Furthermore, the SRA enables the system to change the data rate in a seamless manner by updating the total number of bits per DMT symbol. This is exactly what is necessary in order to transport the NTR since by using a subset of the subchannels to transport the NTR on a specific DMT symbol, the number of bits per DMT symbol is changing from one DMT symbol to another. The SRA methods discussed above allow this to happen seamlessly. However, it is to appreciated that the SRA enables the transport of the NTR regardless of whether the BAT is actually modified on the DMT symbol transporting the NTR, since the total number of bits per DMT symbol for the regular information data is changing from one DMT symbol to another.

Therefore, the NTR signal is inserted and transported at the modulation layer by sending the NTR bits, for example, as specified in the ADSL standard, on a set of carriers of a specified DMT symbol in a superframe. For example, the NTR bits can be sent on the first DMT symbol of the superframe. Thus, for the other DMT symbols in the superframe, the set of carriers used for transporting the NTR can be used to transport other data, such as information data.

This versatility allows the same BAT to be used for the DMT symbol with the NTR bits and the DMT symbol without the NTR bits. However, a different BAT can be used for the DMT symbol that sends the NTR bits, than the DMT symbol (s) that do not send the NTR bits.

In the first case, for the DMT symbol with the NTR bits, a number of subchannels are used to transport the NTR bits, while for DMT symbols without NTR bits, these subchannels are used to transport other data, such as information data. For the second case, where the different BATs are used, the use of different BATs can take advantage of sending the NTR bits with, for example, a higher margin than the regular information bits. This can be especially useful since, the NTR signal may or may not be coded with the FEC coding scheme as the regular information bits.

As an example, during the DMT symbol that transports the NTR bits, the BAT in Table 2 can be used. During the DMT symbols without NTR bits, the BAT in Table 3 can be used. For example, during the DMT symbol that transports the NTR bits, the NTR signal is transmitted in a 4 bit message, as is done in the current ADSL standard, on subchannels 1, 3 and 6 with a high margin.

TABLE 2

| Subchannel Number | Bits Allocated to Subchannel |
|---|---|
| 1 | 1 (NTR) |
| 2 | 6 |
| 3 | 1 (NTR) |
| 4 | 5 |
| 5 | 4 |
| 6 | 2 (NTR) |
| 7 | 5 |
| 8 | 5 |
| 9 | 6 |
| 10 | 4 |
| 11 | 5 |

Total bits per symbol allocated to NTR = 4
Total bits per symbol allocated to regular information data = 40

When the NTR is not being sent, Table 3 illustrates that the BAT changed and that subchannels 1, 3 and 6 are used to transport information data.

TABLE 3

| Subchannel Number | Bits Allocated to Subchannel |
|---|---|
| 1 | 5 |
| 2 | 6 |
| 3 | 6 |
| 4 | 5 |
| 5 | 4 |
| 6 | 4 |
| 7 | 5 |
| 8 | 5 |
| 9 | 6 |
| 10 | 4 |
| 11 | 5 |

Total bits per symbol allocated to NTR = 0
Total bits per symbol allocated to regular information data = 55

While the above examples illustrate the use of subchannels 1, 3 and 6, it is to be appreciated that any subchannels, or combination thereof, can be used with equal success in accordance with this invention.

Figure 12:
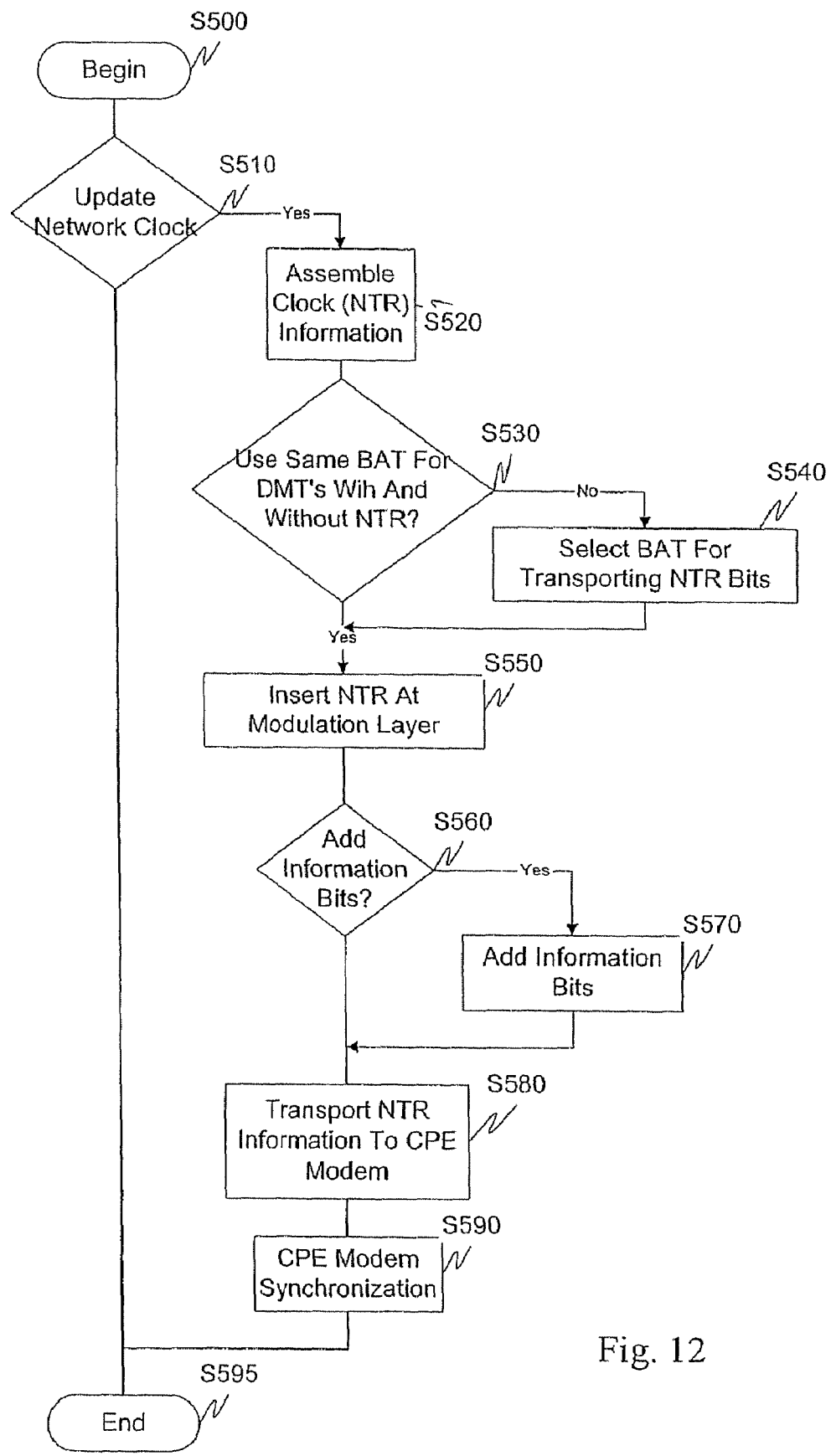
FIG. 12 is flowchart illustrating an exemplary method of transporting a NTR.

FIG. 12 illustrates an exemplary method of transporting an NTR from a CO modem to a CPE modem according to this invention. In particular, control begins in step S500 and continues to step S510. In step S510, a determination is made whether to update the network clock. This update is typically done on a periodic basis, for example, every 69 DMT symbols, in order to allow the receiver to track the network clock using a timing recovery method, such as a phase lock loop. If the network clock is to be updated, control continues to step S520. Otherwise, control jumps to step S595 where the control sequence ends.

In step S520, the NTR information is assembled. Next, in step S530, a determination is made whether the same BAT is to be used for both the normal DMT symbols, i.e., those that do not contain the NTR bits, and the DMT symbols that are used for transmission of the NTR bits. If the same BAT is to be used, control jumps to step S550. Otherwise, control continues to step S540

In step S540, a BAT for use in transporting the NTR bits is selected. Control then continues to step S550. In step S550, the NTR is inserted at the modulation layer. This is done, for example, on the first DMT symbol of a superframe. Next, in step S560, a determination is made whether additional information bits are also to be added to the BAT. If additional information bits are to be added, control continues to step S570. Otherwise, control jumps to step S580. In most cases, additional information bits are added to the BAT. However, if the data rate is very low, then the NTR bits may be the only bits transmitted on that DMT symbol.

In step S570, the information bits are added to the BAT. Control then continues to step S580. In step S580, the NTR is transported to the CPE modem. Then, in step S590, the CPE modem receives the NTR and synchronizes the CPE clock. Control then continues to step S595 where the control sequence ends.

The present invention for initializing modems of transceivers in a multicarrier transmission system and related components can be implemented either on a DSL modem, such as an ADSL modem, or separate programmed general purpose computer having a communication device. However, the present method can also be implemented in a special purpose computer, a programmed microprocessor or a microcontroller and peripheral integrated circuit element, an ASIC or other integrated circuit, a digital signal processor, a hardwired or electronic logic circuit such as a discrete element circuit, a programmable logic device, such as a PLD, PLA, FPGA, PAL, or the like, and associated communications equipment.

Furthermore, the disclosed method may be readily implemented in software using object or object-oriented software development environments that provide portable source code that can be used on a variety of computers, workstations, or modem hardware and/or software platforms. Alternatively, the method may be implemented partially or fully in hardware using standard logic circuits or a VLSI design. Other software or hardware can be used to implement the methods in accordance with this invention depending on the speed and/or efficiency requirements, the particular function, and the particular software and/or hardware or microprocessor or microcomputer being utilized. Of course, the present method can also be readily implemented in a hardware and/or software using any known later developed systems or structures, devices and/or software by those of ordinary skill in the applicable art from the functional description provided herein and with a general basic knowledge of the computer and telecommunications arts.

Moreover, the disclosed methods can be readily implemented as software executed on a programmed general purpose computer, a special purpose computer, a microprocessor and associated communications equipment, a modem, such as a DSL modem, or the like. In these instances, the methods and systems of this invention can be implemented as a program embedded in a modem, such as a DSL modem, or the like. The method can also be implemented by physically incorporating the method into a software and/or hardware, such as a hardware and software system of a multicarrier information transceiver, such as an ADSL modem, VDSL modem, network interface card, or the like.

Thus, it should be evident from the discussion above how the present invention provides an improved method for initializing modems of transceivers in a multicarrier transmission system to establish a communication link between the transmitter and the receiver. By providing and using a predetermined parameter value that approximates a corresponding actual parameter value of the communication link, a data communication link may be attained very quickly to allow the transmission of data. Then, the actual parameter value may be determined and the data rate of the communication link may be seamlessly updated using the determined actual parameter value and the SRA methods described to provide an steady state communication link.

While this invention has been described in conjunction with a number of embodiments, it is evident that many alternatives, modifications and variations would be or are apparent to those of ordinary skill in the applicable art. Accordingly, applicants intend to embrace all such alternatives, modifications, equivalents and variations that are within the spirit and the scope of this invention.

What is claimed:

1. An initialization method for multicarrier communications comprising:

performing an initialization to establish a communication link at a first data rate using a first bit allocation table stored prior to the initialization and seamlessly adapting the first data rate of the communication link to a second data rate using a second bit allocation table, wherein seamlessly adapting the first data rate to the second data rate comprises providing a plurality of codewords (i) having a specified codeword size, and (ii) including a specified number of parity bits for forward error correction; transmitting or receiving a first plurality of codewords at the first data rate; changing the first data rate to the second data rate; and transmitting or receiving a second plurality of codewords at the second data rate, wherein the specified codeword size and the specified number of parity bits for forward error correction used for the first plurality of codewords are used for the second plurality of codewords to achieve a seamless change in data rate.

2. A multicarrier transceiver comprising means for performing an initialization to establish a communication link at a first data rate using a first bit allocation table stored prior to the initialization, and means for seamlessly adapting the first data rate of the communication link to a second data rate using a second bit allocation table, wherein seamlessly adapting the first data rate to the second data rate comprises providing a plurality of codewords (i) having a specified codeword size, and (ii) including a specified number of parity bits for forward error correction; transmitting or receiving a first plurality of codewords at the first data rate; changing the first data rate to the second data rate; and transmitting or receiving a second plurality of codewords at the second data rate, wherein the specified codeword size and the specified number of parity bits for forward error correction used for the first plurality of codewords are used for the second plurality of codewords to achieve a seamless change in data rate.

3. An information storage media including information stored thereon that when executed performs an initialization to establish a communication link at a first data rate using a first bit allocation table stored prior to the initialization and seamlessly adapts the first data rate of the communication link to a second data rate using a second bit allocation table, wherein seamlessly adapting the first data rate to the second data rate comprises providing a plurality of codewords (i) having a specified codeword size, and (ii) including a specified number of parity bits for forward error correction; transmitting or receiving a first plurality of codewords at the first data rate; changing the first data rate to the second data rate; and transmitting or receiving a second plurality of codewords at the second data rate, wherein the specified codeword size and the specified number of parity bits for forward error correction used for the first plurality of codewords are used for the second plurality of codewords to achieve a seamless change in data rate.

* * * * *